United States Patent
Lakra

(10) Patent No.: US 9,684,662 B2
(45) Date of Patent: Jun. 20, 2017

(54) SYSTEMS, APPARATUSES AND METHODS CONFIGURED FOR DOCUMENT CABINET CREATION

(71) Applicant: Oscar Lakra, Jersey City, NJ (US)

(72) Inventor: Oscar Lakra, Jersey City, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 420 days.

(21) Appl. No.: 13/788,242

(22) Filed: Mar. 7, 2013

(65) Prior Publication Data

US 2014/0258915 A1    Sep. 11, 2014

(51) Int. Cl.
  *G06F 3/048*    (2013.01)
  *G06F 17/30*    (2006.01)

(52) U.S. Cl.
  CPC .. *G06F 17/30115* (2013.01); *G06F 17/30716* (2013.01)

(58) Field of Classification Search
  None
  See application file for complete search history.

(56) References Cited

U.S. PATENT DOCUMENTS

| | | | |
|---|---|---|---|
| 6,105,042 A | 8/2000 | Aganovic et al. | |
| 2003/0115326 A1* | 6/2003 | Verma | H04L 29/06 709/225 |
| 2006/0173999 A1* | 8/2006 | Rider | H04L 63/10 709/225 |
| 2007/0074270 A1* | 3/2007 | Meehan | G06F 21/10 726/2 |
| 2008/0255907 A1 | 10/2008 | Motoyama et al. | |
| 2010/0024011 A1* | 1/2010 | Fukuoka | 726/5 |

OTHER PUBLICATIONS

"Work Simply. DocumentMall v9", DocumentMall Product Brief, 2001.
DocumentMall™ Express Quick Reference Guide, 2011.
"DocumentMall v10 User Interface and Feature Updates", 2012.

* cited by examiner

*Primary Examiner* — William Trapanese
(74) *Attorney, Agent, or Firm* — Cooper & Dunham LLP

(57) ABSTRACT

Apparatuses, systems and methods are provided for managing documents, files, folders and cabinets. A user interface is provided for creating a new cabinet as well as allowing the user to customize a permission set for access to the new cabinet.

19 Claims, 32 Drawing Sheets

| USER INFORMATION | | | |
|---|---|---|---|
| ID | Name | Department | Cabinet Access |
| 1 | John Smith | Admin | 1, 2 |
| 2 | Paul Douglas | IT | 2 |
| 3 | Sue White | Legal | 2, 3 |
| 4 | Peter Jones | Accounting | 2, 4 |
| 5 | Martha Spencer | Legal | 2, 3 |
| 6 | Chris Norwood | Management | 2 |
| 7 | Dan Brook | HR | 2 |

Fig. 4A

| | CABINET INFORMATION | | |
|---|---|---|---|
| ID | Name | Owner | Users Permitted Access |
| 1 | Legal Files | John Smith (ID: 1) | Owner only |
| 2 | Funny Videos | Paul Douglas (ID: 2) | Everyone |
| 3 | Pictures_3-11-13 | Sue White (ID: 3) | Custom_Legal |
| 4 | Personal Documents | Peter Jones (ID: 4) | Owner only |

Fig. 4B

| PERMISSION SET INFORMATION | | |
|---|---|---|
| ID | Name | Permission |
| 1 | Owner only | Owner (R/W/D) |
| 2 | Everyone | Owner (R/W/D); Everyone (R) |
| 3 | Custom_Legal | Owner (R/W/D); User 3 (R); User 5 (R) |

R: Read
W: Write
D: Delete

Fig. 4C

CABINET CREATION DATA

| Cabinet Name | Permission Name | Permission Settings | | | | |
|---|---|---|---|---|---|---|
| | | | Name | R | W | D |
| John Smith's Files | John Smith's Friends | Group | legal | ✓ | | |
| | | | developers | ✓ | ✓ | |
| | | User | admin | ✓ | ✓ | ✓ |
| | | | sue.white | ✓ | | |
| | | | martha.spencer | ✓ | | |

Fig. 4D

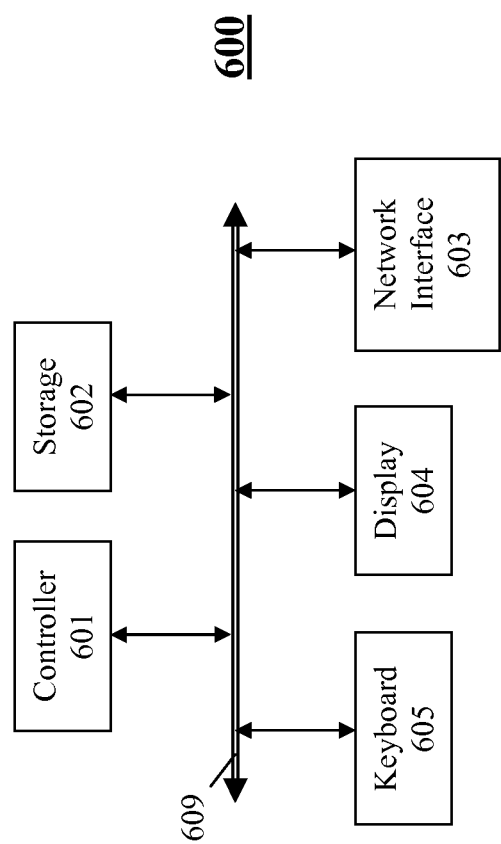

Fig. 8D

New Cabinet

Cabinet Name: John Smith's Files

Choose permission: ◯ Owner Only ◯ Everyone Read ● Custom

Permission Name: John Smith's Friends

Add Group

| | Read | Write | Delete |
|---|---|---|---|
| legal | ✓ | | |
| developers | ✓ | ✓ | |

Add Users

| | Read | Write | Delete |
|---|---|---|---|
| admin | ✓ | ✓ | ✓ |
| sue.white | ✓ | ✓ | |
| martha.spencer | | | |

[ Create ]   [ Cancel ]

Fig. 8E

| Cabinet List | | | |
|---|---|---|---|
| List View | Icon View | | Logged in as: John Smith (admin) |
| Create | Modify | Delete | Help |

| Name | Owner | Modified |
|---|---|---|
| Legal Files | John Smith | 1/21/2013 02:51:16 PM |
| Funny Videos | Paul Douglas | 1/22/2013 11:06:38 AM |
| John Smith's Files | John Smith | 1/27/2013 04:15:45 PM |

Fig. 8F

SYSTEMS, APPARATUSES AND METHODS CONFIGURED FOR DOCUMENT CABINET CREATION

TECHNICAL FIELD

This disclosure relates to systems, apparatuses and methodologies for managing documents and files, and more specifically, providing a user interface for creating a new cabinet as well as allowing the user to customize a permission set for access to the new cabinet.

BACKGROUND

In the current information age, information technology (IT) tools for managing files and data are extensively used in enterprises and other organizations, in order to maintain electronic documents and data in an organized manner.

A document management system may be configured to store documents as electronic files in a remote (and secure) document storage device, in order to protect the documents from theft or loss and to avoid unnecessarily occupying storage space local to the user computer or local computing environment, while making such files available on demand, but with access control, through a network. Such a document management system (for example, DocumentMall™) may be configured to provide users with remote access (that is, through a network) via a document management application and related software services that would otherwise be installed on the user's local computer.

Typically, a conventional document management system allows the user to create folders for storing documents and create cabinets for storing such folders, such as when the user needs to manage a large number of documents. Such a conventional document management system may allow the user to specify who should have access to specific documents, folders and cabinets. For example, the user can create a permission set specifying that read access is given to a particular user (for example, User A) and/or a group of users (for example, Group B), and associate the permission set with specific documents, folders and cabinets to allow User A and/or Group B to be able to read the contents of such specific documents, folders and cabinets.

There is a drawback, however, in that such process of customizing access to the files, folders and cabinets in a document management system is cumbersome, since the user has to first create or upload the file/folder/cabinet, create a permission set specifying customized access, and then associate the created permission set with the file/folder/cabinet.

There exists a need for an improved document management system which is more convenient and easier to use.

SUMMARY

In an aspect of this disclosure, there are provided tools (for example, a system, an apparatus, application software, etc.) to assist a user of a document management system to manage documents, files, folders and/or cabinets, such as in a document base. More specifically, a cabinet creation user interface for creating an electronic document cabinet to be added to the document base can be configured to provide, in a single view, an access right customizing interface for the user to customize access rights to said electronic document cabinet and contents therein. In a preferred embodiment, the single-view access right customizing interface includes (a) a group portion for adding and setting access rights of a group (plural groups) of users, and (b) an individualized user portion for adding and setting access rights of individual users. The cabinet creation part outputs one or more permission sets capturing the access rights, set by the user through the access right customizing interface, for the electronic document cabinet to be added to the document base.

In another aspect, a web service providing apparatus provides a cabinet creation user interface through a network to a terminal operated by a user, and when the user employs the cabinet creation user interface to create the electronic document cabinet to be added along with one or more permission sets, and the web service providing apparatus forwards to a document management engine the permission sets and the electronic document cabinet to be added to the document base.

In another aspect, a web service providing apparatus provides a login user interface through a network to the terminal operated by the user, and provides the cabinet creation user interface to the terminal only after administrative login by the user is authenticated.

In another aspect, a web service providing apparatus consults an application program interface, a group lookup interface and a users lookup interface to formulate a cabinet creation user interface including an access right customizing interface, for output to the terminal operated by the user.

In another aspect, a document management application providing apparatus communicates through a network with a document management application client on a terminal operated by a user. The cabinet creation user interface is provided by the document management application client on the terminal operated by the user, and the document management application client on the terminal operated by the user communicates the electronic document cabinet to be added, along with one or more permission sets specified through the cabinet creation user interface, to the document management application providing apparatus. The document management application providing apparatus forwards to a document management engine the permission sets and electronic document cabinet to be added to the document base.

In another aspect, a document management application client provides the cabinet creation user interface on a terminal operated by a user only after administrative login by the user is authenticated.

In another aspect, a document management application providing apparatus forwards to a document management engine an electronic document cabinet to be added, along with one or more permission sets, to the document base, only after administrative login by the user through the document management application client is authenticated.

In another aspect, a cabinet creation part outputs an electronic document cabinet to be added and one or more permission sets capturing the access rights for the electronic document cabinet, as one object to be added to the document base.

In another aspect, an access right customizing interface provides a list of groups, for the user to select from said list one or more groups to which access rights to the electronic document cabinet are to be set, and upon user selection through the access right customizing interface of a group from the list of groups, the access right customizing interface modifies the group portion of the single view to include the selected group for setting access rights of the group to the electronic document cabinet, and modifies the individualized user portion of the single view to include each individual user amongst the users of the selected group for setting access rights of the individual user to the electronic document cabinet.

BRIEF DESCRIPTION OF THE DRAWINGS

The aforementioned and other aspects, features and advantages can be more readily understood from the following detailed description with reference to the accompanying drawings wherein:

FIG. 4A shows sample user information, according to an exemplary embodiment;

FIG. 4B shows sample cabinet information, according to an exemplary embodiment;

FIG. 4C shows sample permission set information, according to an exemplary embodiment;

FIG. 4D shows sample cabinet creation data, according to an exemplary embodiment;

FIG. 6 shows a block diagram of an exemplary configuration of a document management application providing apparatus, such as illustrated in FIG. 2, according to an exemplary embodiment;

FIG. 8B-8E shows sample screenshots of a user interface for creating a new cabinet, according to an exemplary embodiment;

FIG. 8F shows a sample screenshot of a cabinet list, according to an exemplary embodiment;

DETAILED DESCRIPTION

Figure 1:
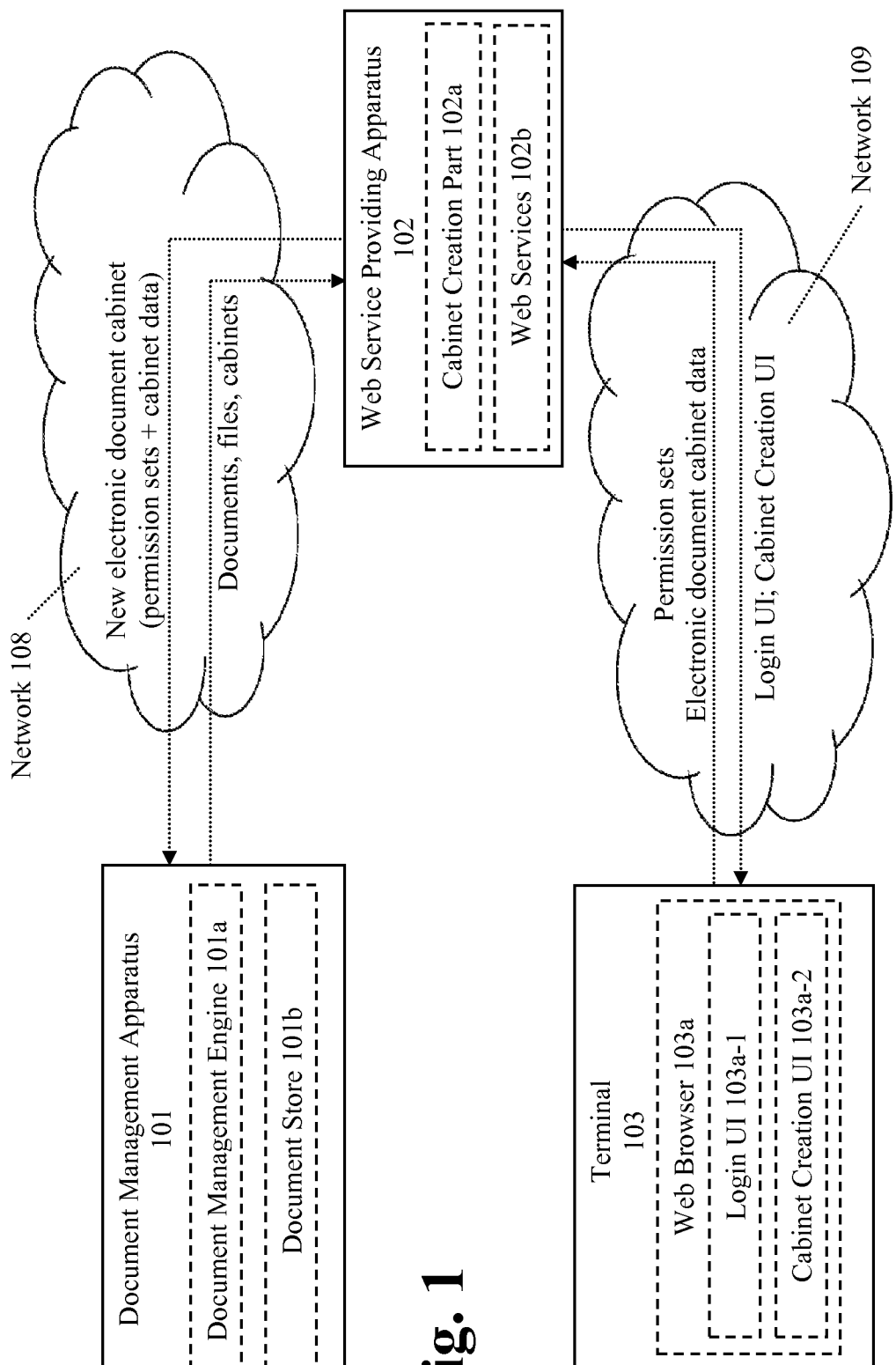
FIG. 1 shows a block diagram of a system for managing documents, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, FIG. 1 shows schematically a system 100 for managing documents, files, folders and cabinets, according to an exemplary embodiment of this disclosure.

The system 100 includes a document management apparatus 101, a web service providing apparatus 102 and a terminal 103. The document management apparatus 101 and the web service providing apparatus 102 are interconnected by a network 108, and the web service providing apparatus 102 and the terminal 103 are interconnected by a network 109.

The document management apparatus 101 includes a document management engine 101a and a document store 101b for storing documents and other data or information, such as files, folders for storing documents and files, and electronic document cabinets for storing documents, files and/or folders. The document management apparatus 101 may be configured to execute a document management application having a plurality of application functionalities, the plurality of application functionalities including a document registration function to register a specified document in a document base, and a search function to search the document base based on specified terms. The document store 101b can comprise one or more structural or functional parts that have or support a storage function. For example, the document store 101b can be, or can be a component of, a source of electronic data, such as a web server, a backend server connected to a web server, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The web service providing apparatus 102 includes a cabinet creation part 102a for creating a new cabinet in the document store 101b, and web services 102b for providing various services to users of the system 100, such as creating or deleting files, folders and cabinets for a user, retrieving contents from the user's folders or cabinets, uploading or downloading documents, checking in or checking out existing documents, and etc. Such web services may also allow creating or modifying users, groups, permission sets and/or document types.

The web service providing apparatus 102 can be configured in software or hosted on any computing device, including but not limited to a personal, notebook or workstation computer, a kiosk, a PDA (personal digital assistant), a MFD, a server, a mobile phone or handset, another information terminal, etc., that can communicate through the networks 108 and 109 with other devices.

The web service providing apparatus 102 of this disclosure may be realized by a computer program product including a computer-usable, non-transient medium (such as a disk storage apparatus) having instructions embodied therein that are executed by a computer. Thus, it should be understood that the web service providing apparatus 102 may be executed on a computer. While the web service providing apparatus 102 is shown as being external to the terminal 103, the web service providing apparatus 102 may in fact be executed on the terminal 103.

The cabinet creation part 102a provides a cabinet creation user interface (UI) for creating an electronic document cabinet to be added to the document base (i.e. in document store 101b). The cabinet creation UI provides, in a single view, an access right customizing interface for a user to customize access rights to the new electronic document cabinet to be created and the contents in the new electronic document cabinet.

As shown in FIG. 1, the cabinet creation part 102a of the web service providing apparatus 102 provides the login UI and the cabinet creation UI to the terminal 103, and causes the terminal 103 to display the login UI 103a-1 and the cabinet creation UI 103a-2 to the user at the terminal 103, for example, via a web browser (web browser 103a).

Figure 7A:
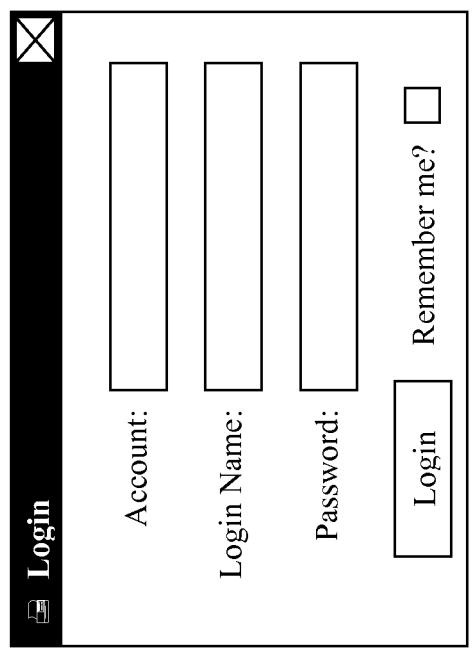
FIGS. 7A and 7B show sample screenshots of a user interface displayed to the user, according to an exemplary embodiment.
Figure 7B:

For example, FIG. 7A shows an example of the login UI 103a-1 displayed to the user at the terminal 103. The login screen shown in FIG. 7A allows the user at the terminal 103 to enter the account number, login name and password of the user. As shown in FIG. 7B, the user at the terminal 103 can provide his or her account number, login name and password and activate the "login" button to be authenticated, for example, either as a regular user or an administrative user.

Figure 8A:
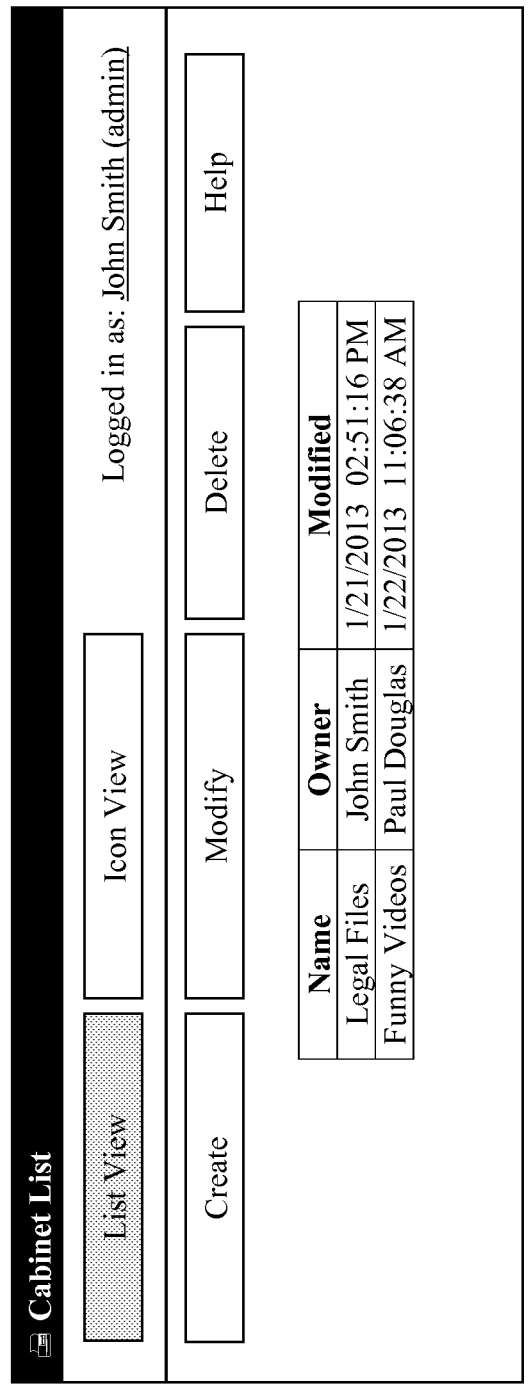
FIG. 8A shows a sample screenshot of a cabinet list, according to an exemplary embodiment.

FIG. 8A shows a cabinet list UI displayed upon successful authentication of the user at the terminal 103 as an administrative user via the login UI of FIG. 7A. As shown in FIG. 8A, the cabinet list UI includes "list view" and "icon view" buttons for choosing the style of viewing the electronic document cabinets. In the example of FIG. 8A, the "list view" button is selected, and thus, the list of cabinets are displayed in a list view, as shown in FIG. 8A (i.e. "legal files" and "funny videos"). Alternatively, the user may select the "icon view" button to have the cabinets represented by icons, as shown in the example of FIG. 8G. The cabinet list UI further includes a "create" button for creating a new cabinet, a "modify button" for modifying one of the existing cabinets, a "delete" button for deleting one of the existing cabinets and a "help" button for obtaining additional details regarding the cabinet list.

Figure 8B:
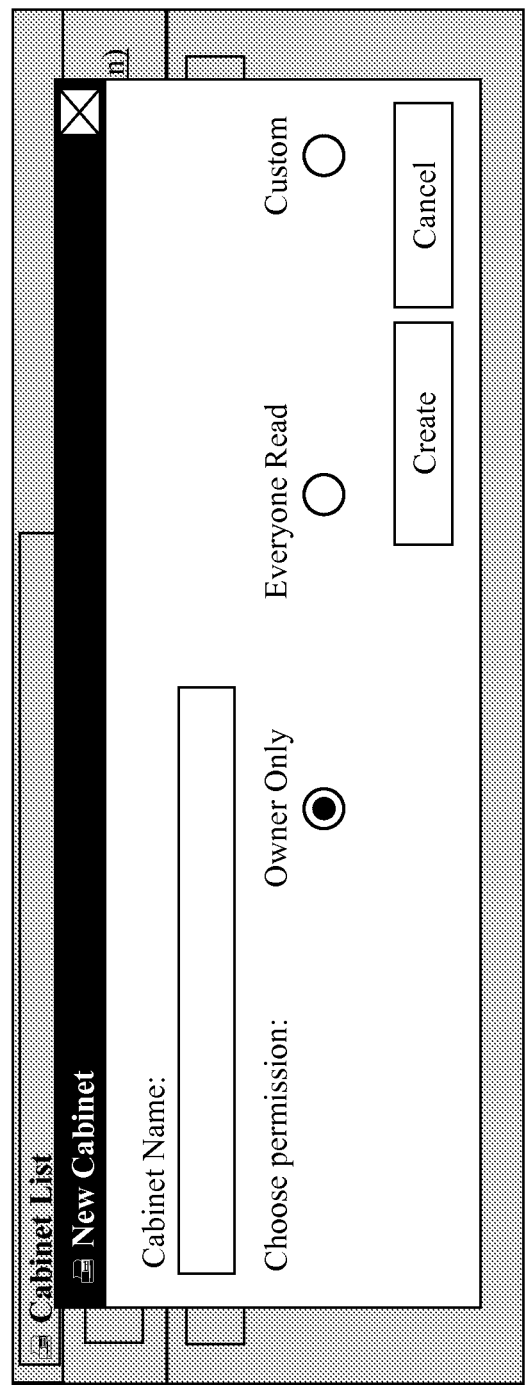
Figure 8C:
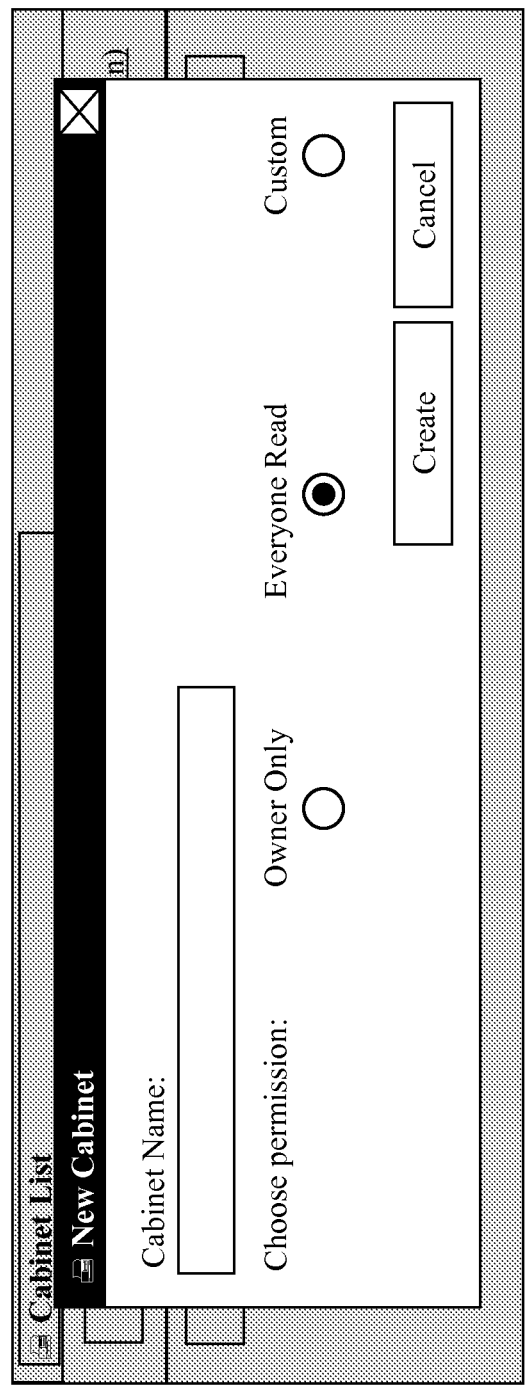
Figure 8D:
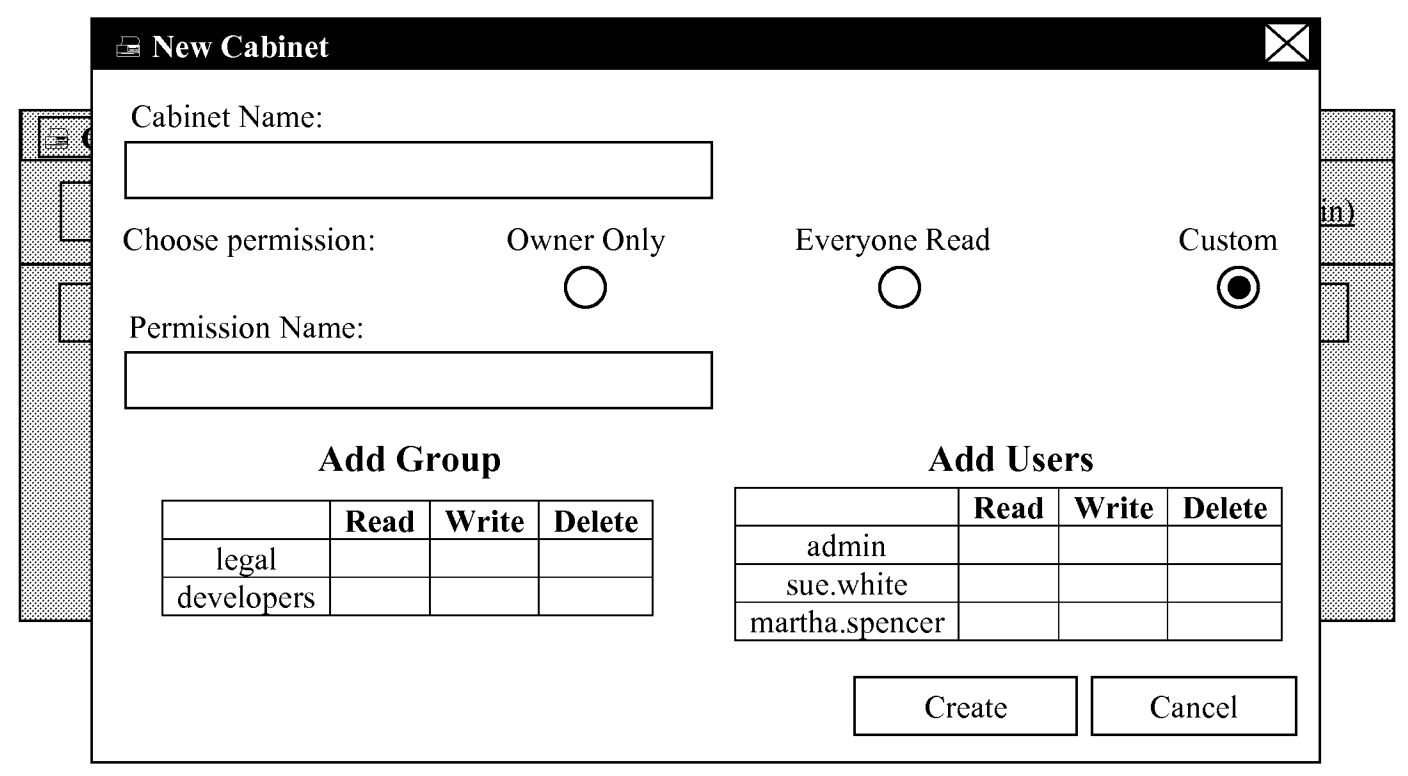
Figure 8G:
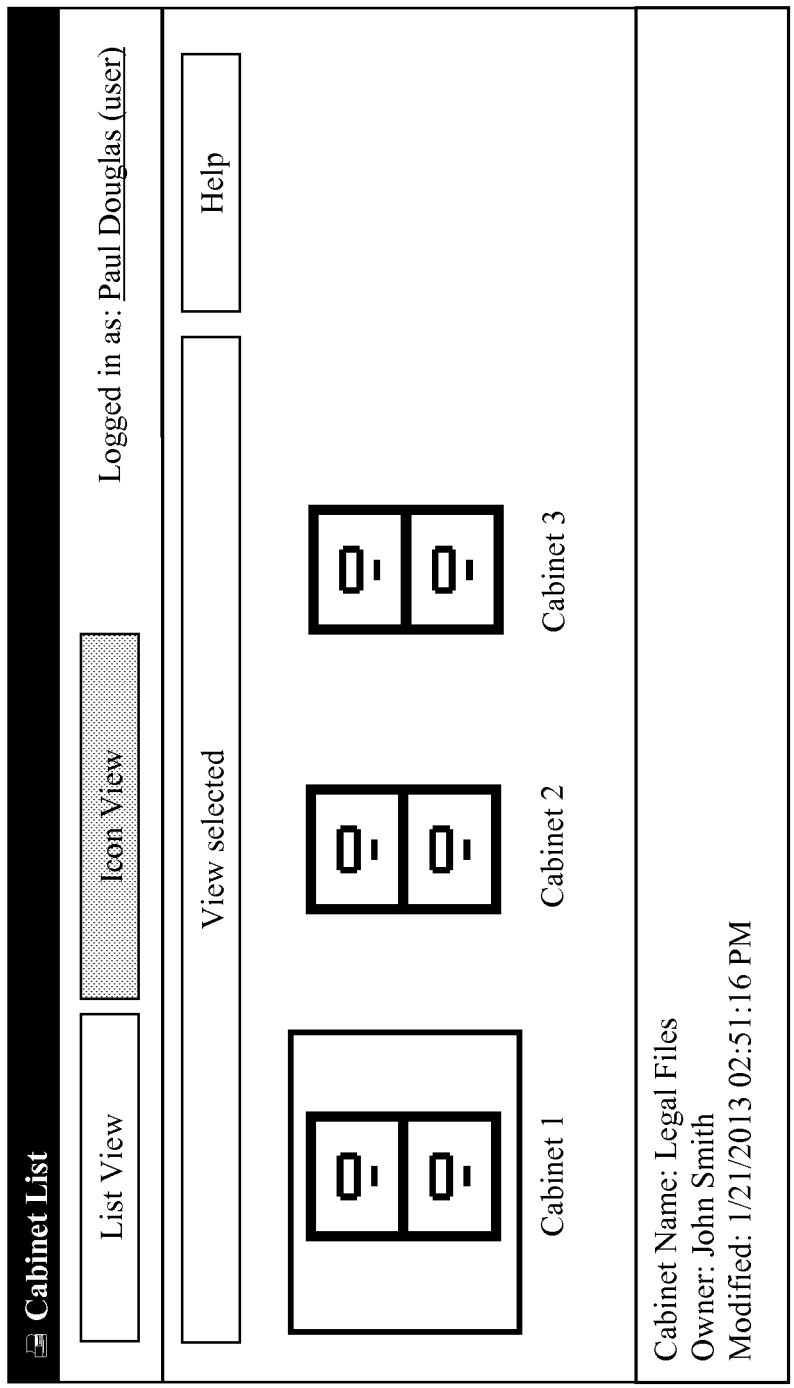
FIG. 8G shows a sample screenshot of a cabinet list, according to an exemplary embodiment.

FIG. 8B shows an example of the cabinet creation UI 103a-2 displayed to the user at the terminal 103. The cabinet creation UI shown in FIG. 8B includes a field for specifying the name of the new cabinet ("cabinet name"), and a plurality of predetermined permission sets for specifying user/group access to the new cabinet that to be created (i.e. "owner only" and "everyone read). The "owner only" radio button specifies that the new cabinet is to be accessible by the only the owner who created the cabinet. The "everyone read" radio button specifies that everyone is to have read access to the cabinet (FIG. 8C). In addition, upon activating the "custom" radio button, the cabinet creation UI expands to display additional options (e.g. access rights customizing interface), as shown in FIG. 8D.

As shown in FIG. 8D, the cabinet creation UI of FIG. 8D further includes a field for specifying the name of the permission set ("permission name"). In addition, at the bottom of the screen, a list of groups associated with the user (i.e. "John Smith") is displayed on the left side, and a list of users associated with the user (i.e. "John Smith") is displayed on the right side. As shown in FIG. 8E, any of the three boxes corresponding to each of the groups and users may be checked off to create a custom permission set, where the "read" column indicates whether the group or user is to have permission to read the contents of the new cabinet, the "write" column indicates whether the group or user is to have permission to write or modify the contents of the new cabinet, and the "delete" column indicates whether the group or user is to have permission to delete the contents of the new cabinet. It should be appreciated that the single-view configurations shown in FIGS. 8B-8E are mere examples, and the access right customizing interface may be included in the cabinet creation UI in other ways.

The user at the terminal 103 can activate the "create" button in the cabinet creation UI of FIG. 8D to create the new cabinet "John Smith's Files". As shown in FIG. 8F, the new cabinet "John Smith's Files" is now listed in the cabinet list displayed to the user at the terminal 103.

Referring back to FIG. 1, when the user activates the "create" button of the cabinet creation UI after he or she is done specifying the properties of the new cabinet, the permission set selected by the user and other data (e.g. cabinet name) of the new cabinet are transmitted to the web service providing apparatus 102, and the web service providing apparatus 102 causes the new cabinet to be created in the document base maintained by the document management engine 101b of the document management apparatus 101. For example, as shown in FIG. 1, the "new electronic document cabinet" forward by the web service providing apparatus 102 to the document management engine 101b is a combination of the user-specified permission sets and the electronic document cabinet to be created.

The web services 102 include various user functionalities provided to users of the document management system (e.g. system 100), including retrieving files from the document base managed by the document management engine 101b, uploading files to the document base managed by the document management engine 101b, deleting documents in the user's account, creating new folders and cabinets for storing files, etc. The web services 102 also include administrative functionalities such as creating and modifying users, groups, permissions sets and document types. For example, such functionalities can be utilized by using HTTP/HTTPS calls (e.g. from a web browser running on the terminal 103).

Each of the document management apparatus 101, the web service providing apparatus 102 and the terminal 103 may include an internal storage unit therein and/or an external storage unit connected thereto, for storing various information and data generated or received via the networks 108 and 109.

With reference to FIGS. 4A-4D, data stored and maintained in the system 100 according to an exemplary embodiment are illustrated.

FIG. 4A shows sample user information maintained, for example, by the document management apparatus 101, according to an exemplary embodiment. The user information includes, for each user registered in the document management system, a user ID (e.g. "1"), the name of the user (e.g. "John Smith"), the department or group to which the user belongs (e.g. "Admin"), and the cabinets (e.g. identified by the cabinet ID) which the user is permitted to access (e.g. "1" and "2"), as shown in FIG. 4A.

FIG. 4B shows sample cabinet information maintained, for example, by the document management apparatus 101, according to an exemplary embodiment. The cabinet information includes, for each cabinet stored in the document management system, a cabinet ID (e.g. "1"), the name of the cabinet (e.g. "legal files"), the owner of the cabinet (e.g. "John Smith") and the users permitted to access the cabinet (e.g. "owner only", i.e. "John Smith").

FIG. 4C shows sample permission set information maintained, for example, by the document management apparatus 101, according to an exemplary embodiment. The permission set information includes, for each permission set that is either pre-stored or user-created, the permission set ID (e.g. "1), the name of the permission set (e.g. "owner only"), and the access rights specified by the permission set (e.g. "owner (R/W/D)", i.e. owner has read access, write access and delete access).

FIG. 4D shows sample cabinet creation data provided to the document management apparatus 101 upon creation of a new electronic document cabinet, according to an exemplary embodiment. The cabinet creation data includes the name of the cabinet to be created (e.g. "John Smith's Files"), the name of the permission set associated with the cabinet to be created (e.g. "John Smith's Friends"), and the access rights specified by the permission set (indicated under "permission settings").

The information (such as shown in FIGS. 4A-4D) collected and/or stored in the system 100 is not limited to those discussed in the present disclosure, and may include other information relevant to providing document management services. Such information can be stored in an internal storage resident in the document management apparatus 101 and/or the web service providing apparatus 102. Alternatively, the information can be stored externally in a storage unit connected to the document management apparatus 101 and/or the web service providing apparatus 102, or accessible via the networks 108 and 109, and retrieved as needed. For example, the information may be stored in one or more databases [e.g. off-the-shelf database applications based on SQL (Structured Query Language), or other customized database applications with search/query function]. If the information is stored in more than one location, the information may be synced, for example, periodically or upon a user request.

Referring back to FIG. 1, the terminal 103 may include a processing unit and a display unit, where the processing unit executes an application (e.g. web browser 103a) to cause the display unit to display the user interfaces (e.g. login UI 103a-1, cabinet creation UI 103a-2, etc.) provided by the cabinet creation part 102a. The terminal 103 is further described infra with reference to FIG. 5.

It should be appreciated that while only the terminal 103 is shown in the example of FIG. 1, the system 100 can include more terminals. Indeed, the document management system of this disclosure is preferably configured to be scalable such that terminals can be added to the system as desired and needed (e.g. to serve more users).

Each of the networks 108 and 109 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 109. In addition, each of the networks 108 and 109 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference. Although the networks 108 and 109 are shown as two separate networks in the example of FIG. 1, they may both be represented by a single network.

Figure 2:
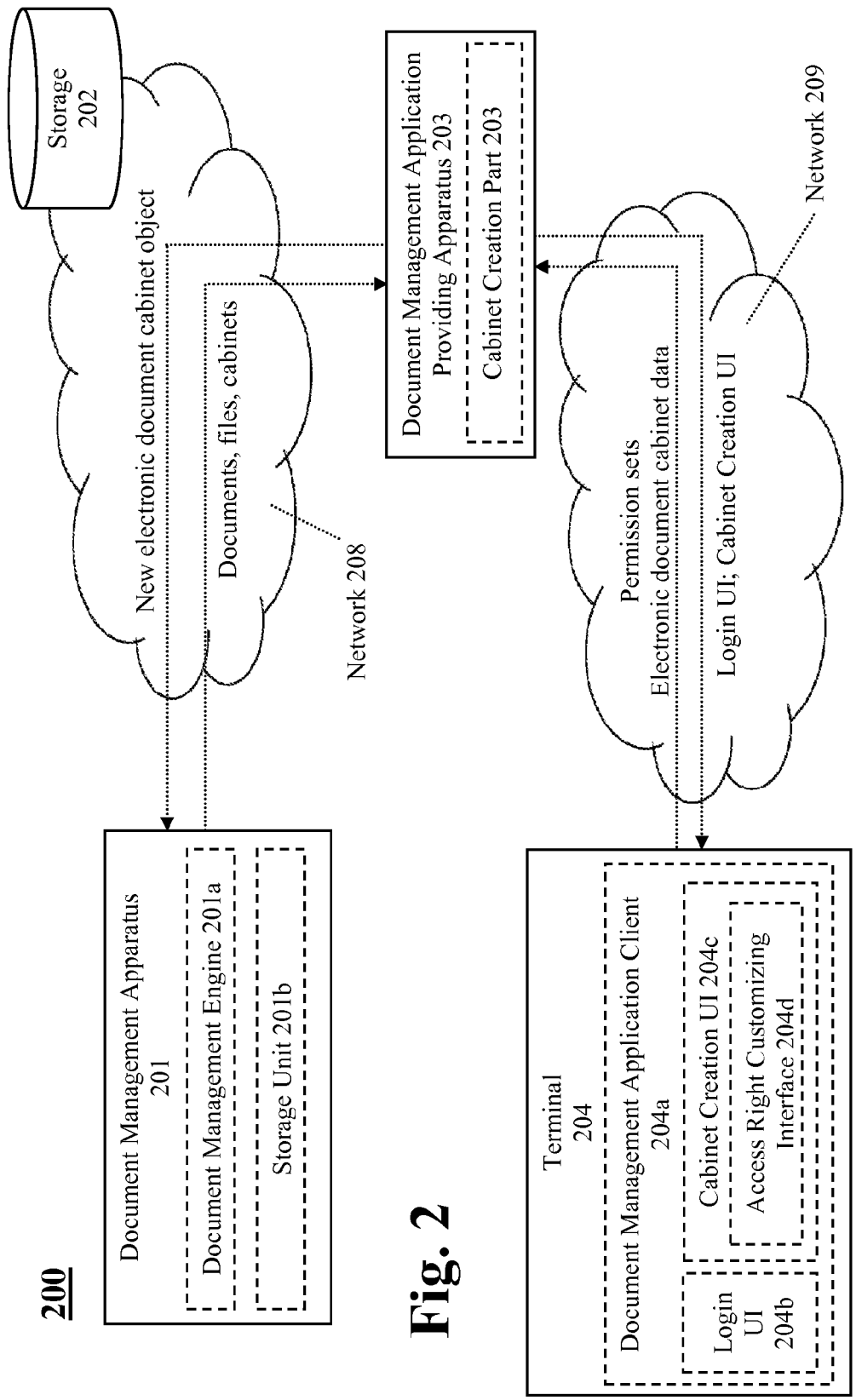
FIG. 2 shows a block diagram of a system for managing documents, according to another exemplary embodiment.

FIG. 2 shows schematically a system 200 for managing documents, files, folders and cabinets, according to another exemplary embodiment of this disclosure. The system 200 includes a document management apparatus 201 including a storage unit 201b, a storage 202, a document management application providing apparatus 203 including a cabinet creation part 203a and a terminal 204. The document management apparatus 201, the storage 202 and the document management application providing apparatus 203 are interconnected by a network 208, and the document management application providing apparatus 203 and the terminal 204 are interconnected by a network 209.

In the system 200, the storage 202 connected to the network 208 is accessible by the document management apparatus 201 and the document management application providing apparatus 203, and any information or data generated or collected by the document management apparatus 201 and the document management application providing apparatus 203 (or a portion thereof) may be stored in the storage 202.

Further, the document management application providing apparatus 203 provides to the terminal 204 a document management application client 204a, and the document management application providing apparatus 203 communicates with the document management application client 204a to provide a login UI 204b and a cabinet creation UI 204c on the terminal 204.

The document management application providing apparatus 203 can be configured in software or hosted on any computing device, including but not limited to a personal, notebook or workstation computer, a kiosk, a PDA (personal digital assistant), a MFD, a server, a mobile phone or handset, another information terminal, etc., that can communicate through the networks 208 and 209 with other devices.

The document management application providing apparatus 203 of this disclosure may be realized by a computer program product including a computer-usable, non-transient medium (such as a disk storage apparatus) having instructions embodied therein that are executed by a computer. Thus, it should be understood that the document management application providing apparatus 203 may be executed on a computer. While the document management application providing apparatus 203 is shown as being external to the terminal 204, the document management application providing apparatus 203 may in fact be executed on the terminal 204.

Also, as shown in FIG. 2, the document management application providing apparatus 203 forwards a new electronic cabinet object to be added to the document base managed by the document management engine 201a of the document management apparatus 201. For example, such electronic cabinet object includes the new electronic document cabinet to be created and the permission sets capturing the access rights for the new electronic document cabinet.

Otherwise, operations of the elements of the system 200 are similar to those discussed in connection with the corresponding elements of the system 100 of FIG. 1.

Figure 3A:
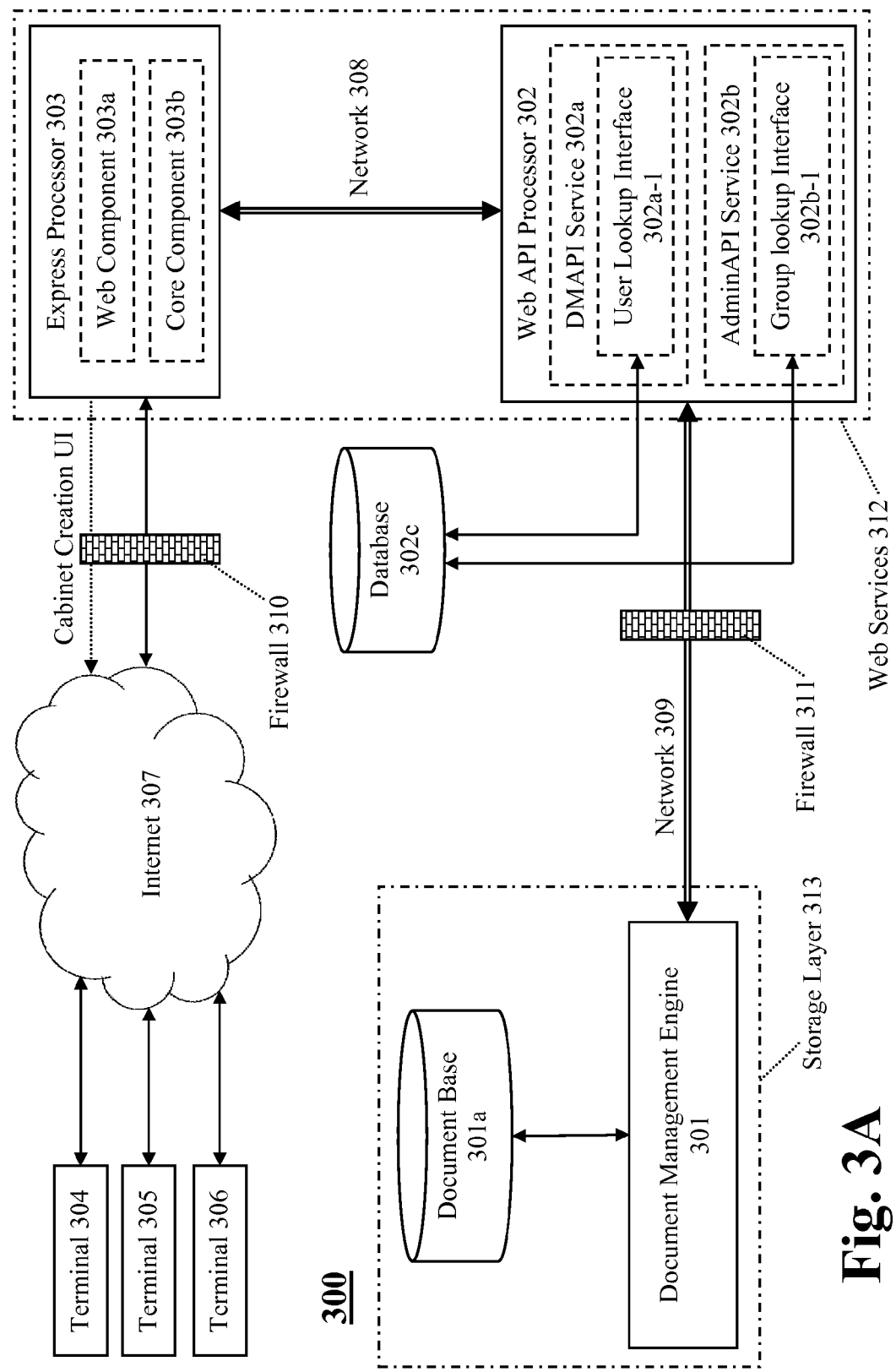
FIG. 3A shows a block diagram of a system for managing documents, according to another exemplary embodiment.

FIG. 3A shows schematically a system 300 for managing documents, files, folders and cabinets, according to another exemplary embodiment of this disclosure. The system 300 includes a document management engine 301, a document base 301*a* connected to the document management engine 301, a web API processor 302, a database 302*c*, an express processor 303 and terminals 304-306. The terminals 304-306 communicate with the express processor 303 via the Internet 307, the express processor 303 communicates with the web API processor 302 via a network 308, and the web API processor 302 communicates with the document management engine 301 via a network 309. For example, the network 308 and/or the network 309 may be a dedicated secure channel that is internal to an enterprise. In addition, as shown in FIG. 3A, a firewall 310 is placed between the terminals 304-306 and the express processor 303, and a firewall 311 is placed between the web API processor 302 and the document management engine 301, for security purposes. As illustrated in FIG. 3A, the express processor 303 and the web API processor 302 collectively constitute web services 312, and the document management engine 301 and the document base 301*a* collectively constitute a storage layer 313.

Figure 19A:
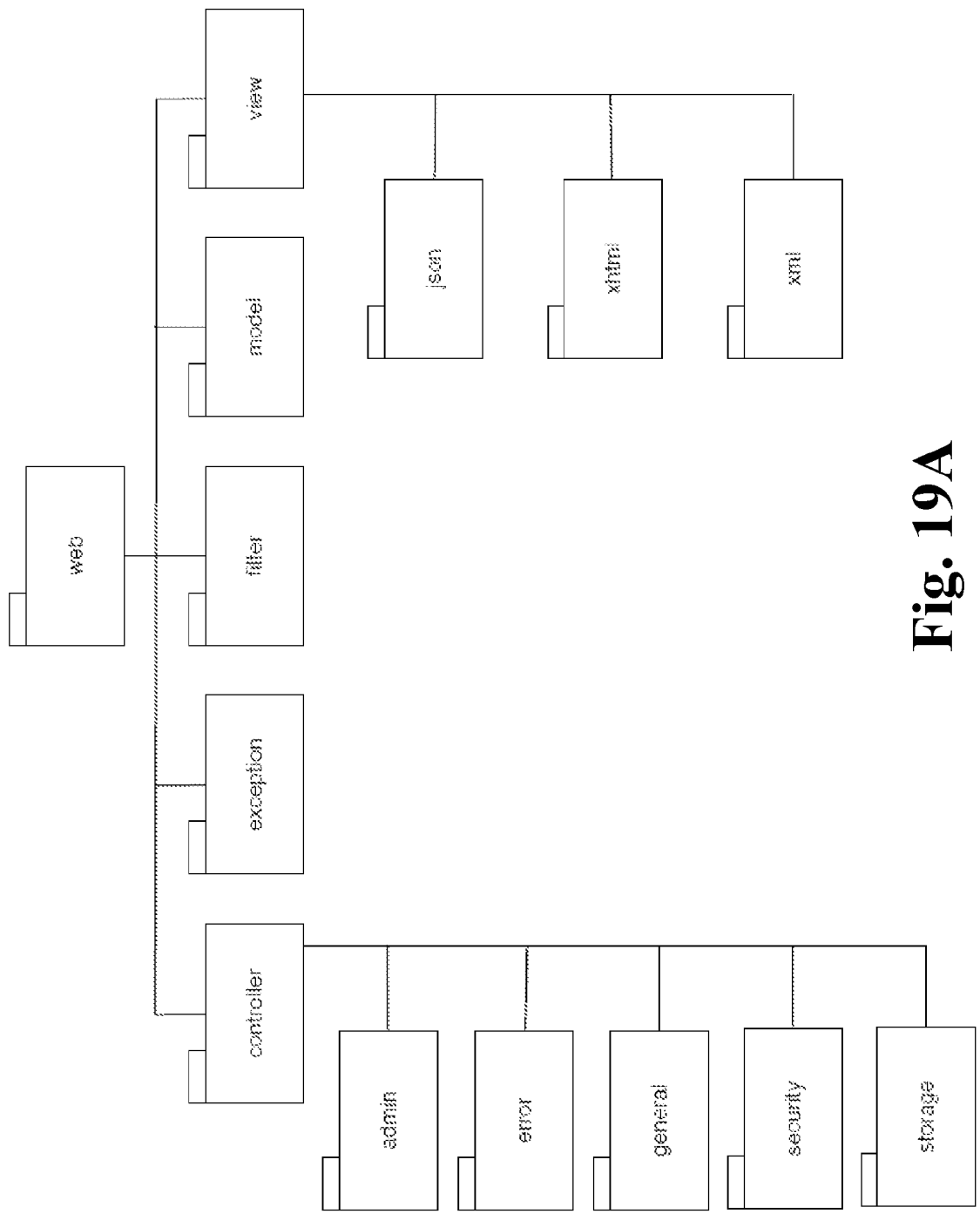
FIG. 19A shows an exemplary configuration of the web component of an express processor.
Figure 19B:
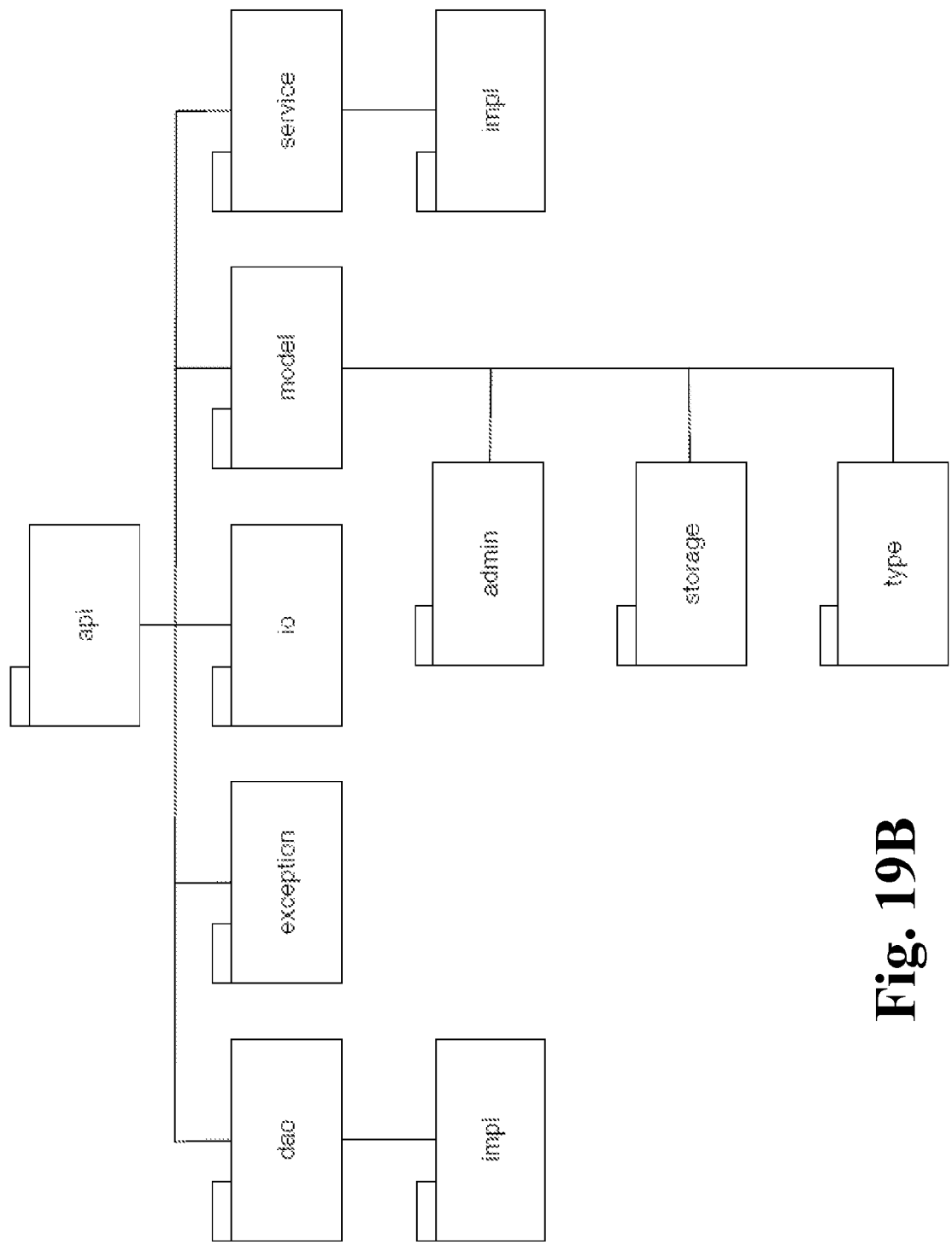
FIG. 19B shows an exemplary configuration of the core component of an express processor, according to an exemplary embodiment.

The express processor 303 includes a web component 303*a* and a core component 303*b*. The web component 303*a* is responsible for managing all interactions with the terminals 304-306 (e.g. the web browser running on the terminals 304-306), such as managing HTTP sessions, the model objects, the controllers, the views, etc. The core component 303*b* is responsible for managing all the business rules, HTTP-based communication with the web API processor 302, and model objects that represent the objects stored within the document base 301*a* such as cabinets, folders, documents, etc. As shown in FIG. 3A, the express processor 303 provides a cabinet creation UI to the terminals 304-306 via the network 307. Exemplary configurations of the web component 303*a* and the core component 303*b* are shown in FIGS. 19A and 19B, respectively.

The web API processor 302 includes DMAPI service 302*a* and AdminAPI service 302*b*. The DMAPI service 302*a* includes a user lookup interface 302*a*-1 which communicates with the database 302*a* to retrieve the list of users associated with the user's account (i.e. the account of the user who is currently logged in). The AdminAPI service 302*b* includes a group lookup interface 302*b*-1 which communicates with the database 302*a* to retrieve the list of groups associated with the user's account.

The DMAPI service 302*a* provides methods available over HTTPS that interact with a user's document management account. Both the DMAPI service 302*a* and the AdminAPI service 302*b* enable qualified applications (e.g. express application running on the express processor 303) to access the document management functionalities provided by the document management engine 301 using the following technology: (1) industry standard HTTP posts to access web-enabled remote procedure calls (RPC), (2) "string" based parameters to send and retrieve information from the DMAPI, and (3) HTTPS protocol tunneling as well as server-side authentication to ensure the integrity of the document management system. For example, the DMAPI service 302*a* supports the following user functionalities: (1) create or delete cabinets and folders on the fly; (2) retrieve contents of the folders in the user's account; (3) upload or download documents; (4) check in or check out existing documents; and (5) delete documents in the user's account. Also, for example, the AdminAPI service 302*b* supports the following user functionality: create and modify users, groups, permission sets and document types.

The firewalls 310 and 311 control the incoming and outgoing traffic by analyzing the data packets and can either be software-based or hardware-based. Implementation of such firewalls is known in the art and thus is not discussed in greater detail herein.

It should be appreciated that while only the terminals 304-306 are shown in the example of FIG. 3A, the system 300 can include more terminals. Indeed, the document management system of this disclosure is preferably configured to be scalable such that terminals can be added to the system as desired and needed (e.g. to serve more users).

Although the networks 307-309 are shown as three separate networks in the example of FIG. 3A, some or all of the networks 307-309 may be combined into a single network.

Otherwise, operations of the elements of the system 300 are similar to those discussed in connection with the corresponding elements of the system 100 of FIG. 1.

Figure 3B:
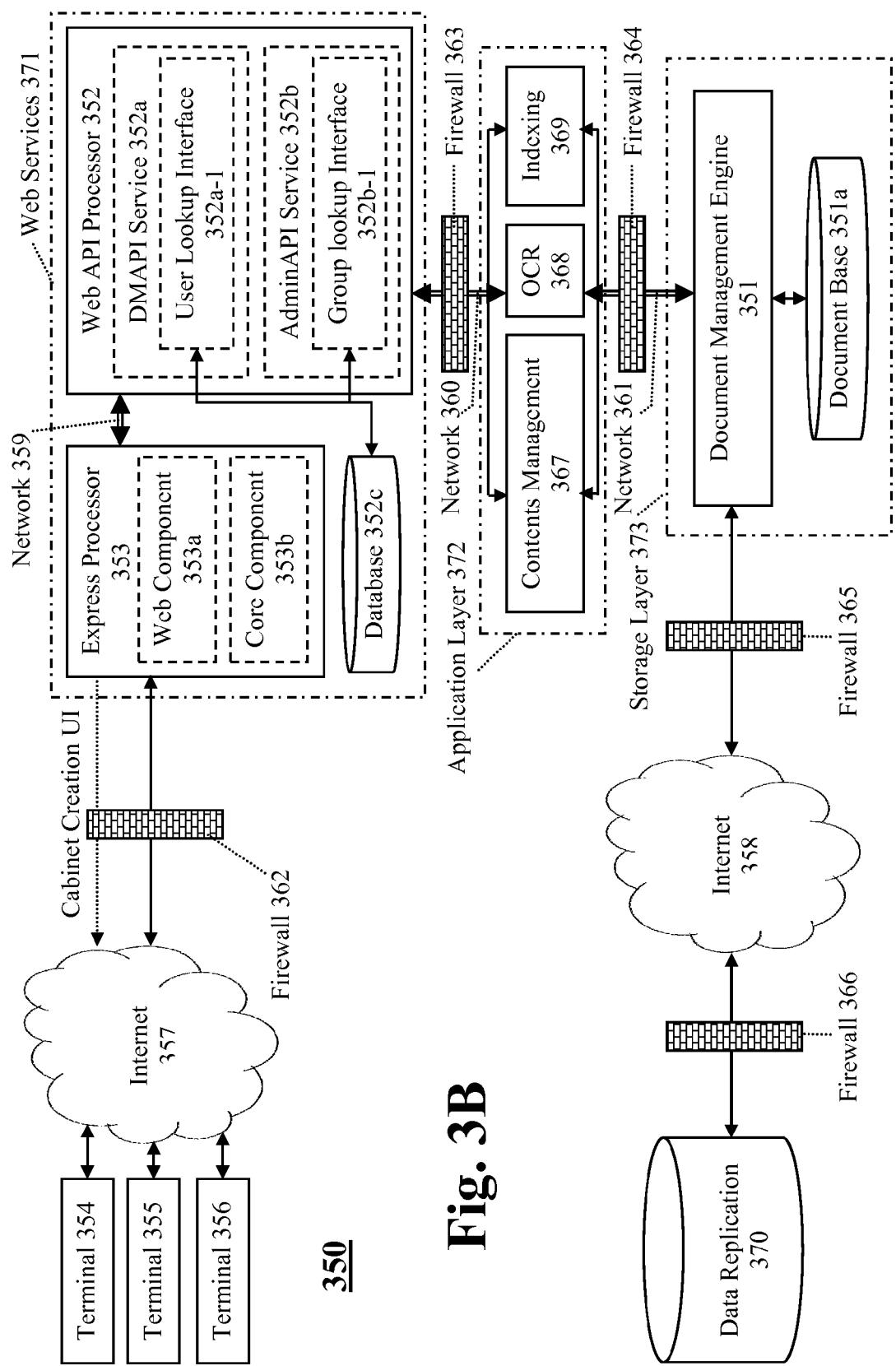
FIG. 3B shows a block diagram of a system for managing documents, according to another exemplary embodiment.

FIG. 3B shows schematically a system 350 for managing documents, files, folders and cabinets, according to another exemplary embodiment of this disclosure.

The system 350 includes an application layer 372 between the web services 371 and the storage layer 373. The application layer 372 includes a contents management application 367 (e.g. for allowing publishing, editing and modifying content as well as maintenance from a central interface), an OCR (optical character recognition) application 368 (e.g. for converting scanned images of text into machine-encoded text) and an indexing application 369 (e.g. for facilitating lookups and access of documents).

A firewall 363 is placed between the web API processor 352 and the application layer 372, and a firewall 364 is placed between the application layer 372 and the document management engine 351.

The system 370 further includes a data replication database 370 which is connected to the storage layer 373 via the Internet 358 and firewalls 365 and 366.

Otherwise, the operations of the elements of the system 350 are similar to those discussed in connection with the corresponding elements of the system 300 of FIG. 3A.

Figure 5:
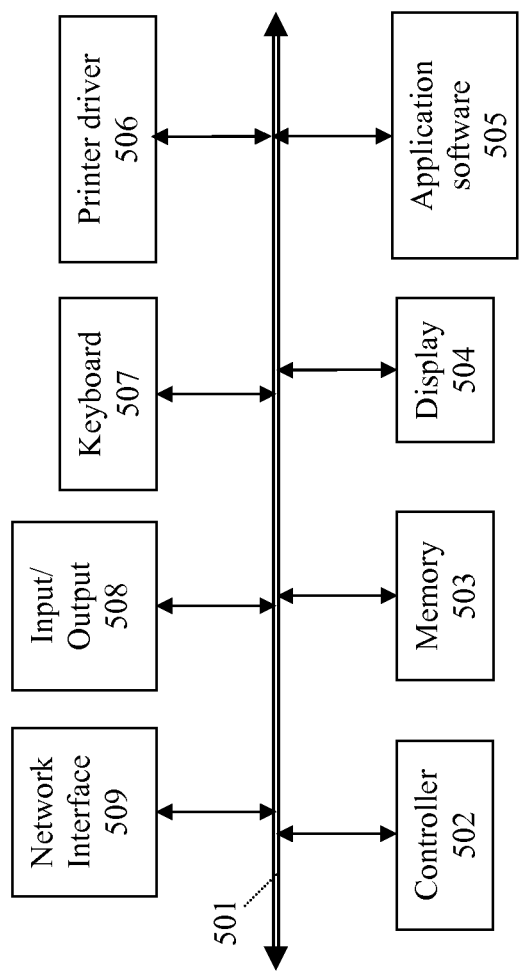
FIG. 5 shows a block diagram of an exemplary configuration of a terminal, such as illustrated in FIG. 1, according to an exemplary embodiment.

Now referring to FIG. 5, an exemplary constitution of the terminal 103 of FIG. 1 (for example, as a computer) is described.

In FIG. 5, computer 500 includes a controller (or central processing unit) 502 that communicates with a number of other components, including memory 503, display 504, keyboard (and/or keypad) 507, other input/output (such as mouse, touchpad, stylus, microphone and/or speaker with voice/speech interface and/or recognition software, etc.) 508, network interface 509, print driver 506 and application software 505, by way of an internal bus 501.

The memory 503 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 509 provides a connection (for example, by way of an Ethernet connection or other network connection which supports any desired network protocol such as, but not limited to TCP/IP, IPX, IPX/SPX, or NetBEUI) to the network to which the computer 500 is connected (e.g. network 109 of FIG. 1).

The print driver 506 and application software 505 are shown as components connected to the internal bus 501, but in practice are typically stored in storage media such as a hard disk or portable media, and/or received through the network, and loaded into memory 503 as the need arises.

Depending on the type of the particular terminal device, one or more of the components shown in FIG. 5 may be missing. For example, a particular mobile phone may be missing the print driver 506 and the keyboard 507.

Additional aspects or components of the computer 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

The terminal 103 of FIG. 1 (or other devices described in the present disclosure) may be any device including but not limited to a personal, notebook or workstation computer, a terminal, a kiosk, a personal digital assistant (PDA), a tablet computing device, a smartphone, a scanner, a printer, a facsimile machine, a multi-function device (MFD), a server, a mobile phone or handset, another information terminal, etc. Each device may be configured with software allowing the device to communicate through a network with a web service providing apparatus and/or a document management application providing apparatus in the present disclosure.

FIG. 6 shows an exemplary constitution of a computing device that can be configured (for example, through software) to operate (at least in part) as the web service providing apparatus 102 of FIG. 1, or the document management application providing apparatus 201 of FIG. 2. As shown in FIG. 6, the management unit 600 includes a controller (or central processing unit) 601 that communicates with a number of other components, including memory or storage part 602, network interface 603, display 604 and keyboard 605, by way of a system bus 609.

The management unit 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management unit 600, the controller 601 executes program code instructions that control device operations. The controller 601, memory/storage 602, network interface 603, display 604 and keyboard 605 are conventional, and therefore in order to avoid obfuscating the inventive aspects of this disclosure, such conventional aspects will not be discussed in detail herein.

The management unit 600 includes the network interface 603 for communications through a network, such as communications through the network 109 with the terminal 103 in FIG. 1. However, it should be appreciated that the subject matter of this disclosure is not limited to such configuration. For example, the management unit 600 may communicate with client terminals through direct connections and/or through a network to which some components are not connected. As another example, the management unit 600 does not need to be provided by a server that services terminals, but rather may communicate with the devices on a peer basis, or in another fashion.

The web service providing apparatus or the document management application providing apparatus of the present disclosure is not limited to a server or computer, but can be manifested in any of various devices that can be configured to communicate over a network and/or the Internet.

Also, in the systems of FIGS. 1 and 2, one or more firewalls, although not shown, may be included between the various units/apparatuses discussed in connection with FIGS. 1 and 2 for security purposes.

Figure 9:
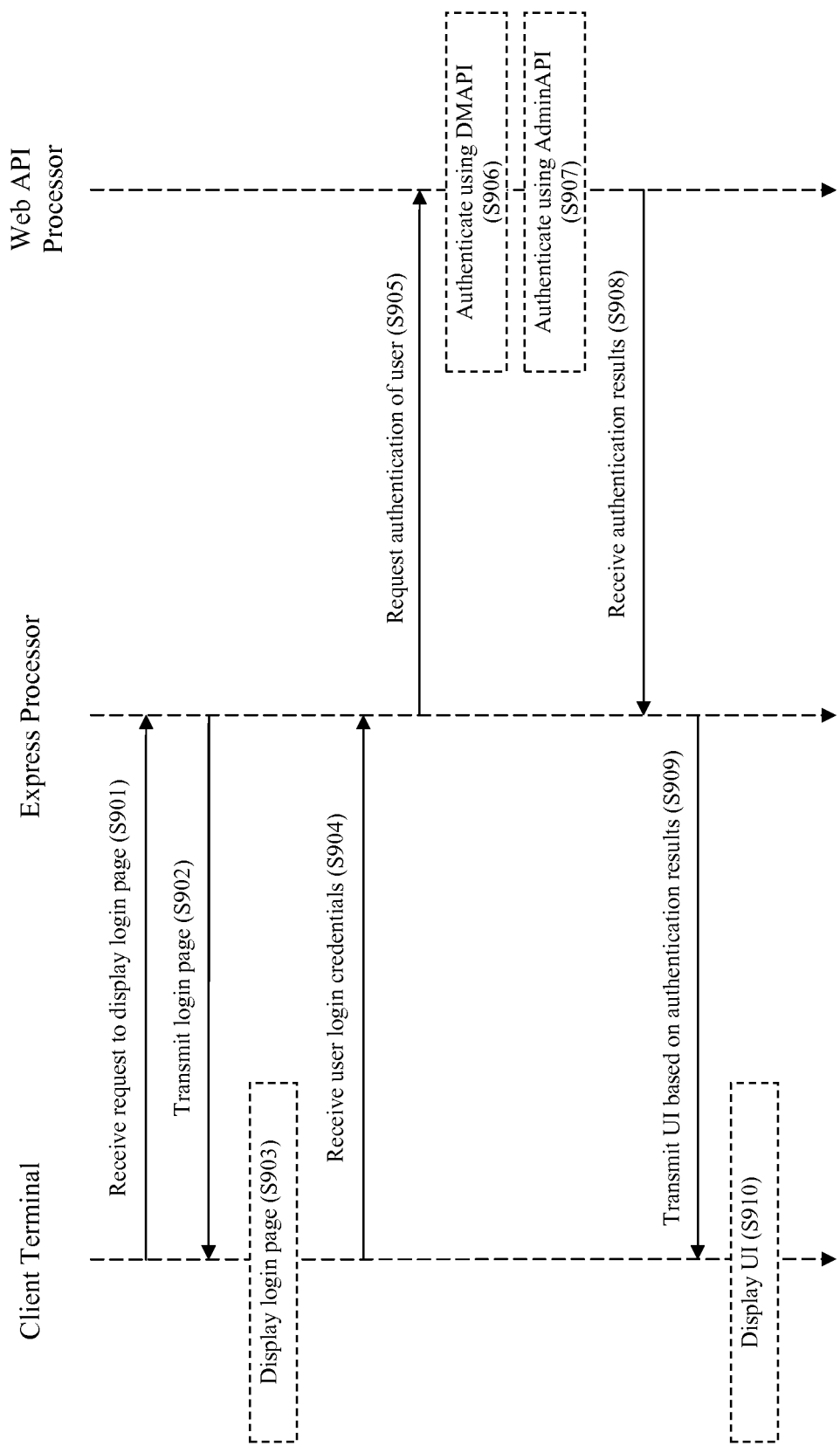
FIG. 9 shows a work flow of a method for authenticating a user, according to an exemplary embodiment.

With reference to FIG. 9, a work flow of a method for authenticating a user, according to an exemplary embodiment is described.

When the express processor receives a request to display a login page from the client terminal (step S901), the express processor transmits the requested login page to the client terminal (step S902), and the transmitted login page is displayed to the user at the client terminal (step S903). When the user at the client terminal submits his or her login credentials via the login page, the express processor receives the user login credentials (step S904), and using the received login credentials, sends a request to authenticate the user to the web API processor (step S905). The web API processor authenticates the user using the DMAPI web services (e.g. as a regular user of the document management system) (step S906) and authenticates the user using the AdminAPI web services (e.g. as an administrative user of the document management system) (step S907). The web API processor returns to the express processor the authentication results (step 908), and the express processor transmits to the client terminal a user interface (e.g. a cabinet list) based on the received authentication results (step S909). For example, if the user is authenticated as an administrative user, the user interface displayed to the user includes administrative functions, such as tools for managing the cabinets (e.g. "create", "modify" and "delete" shown in FIG. 8A). On the other hand, if the user is authenticated as a regular user, the user interface only includes functions that do not require administrative login (e.g. the example of FIG. 8G, which illustrates the cabinet list displayed to a regular user "Paul Douglas", only has a "view selected" button). The user interface transmitted to the client terminal by the express processor is displayed to the user at the client terminal (step S910).

Figure 10:
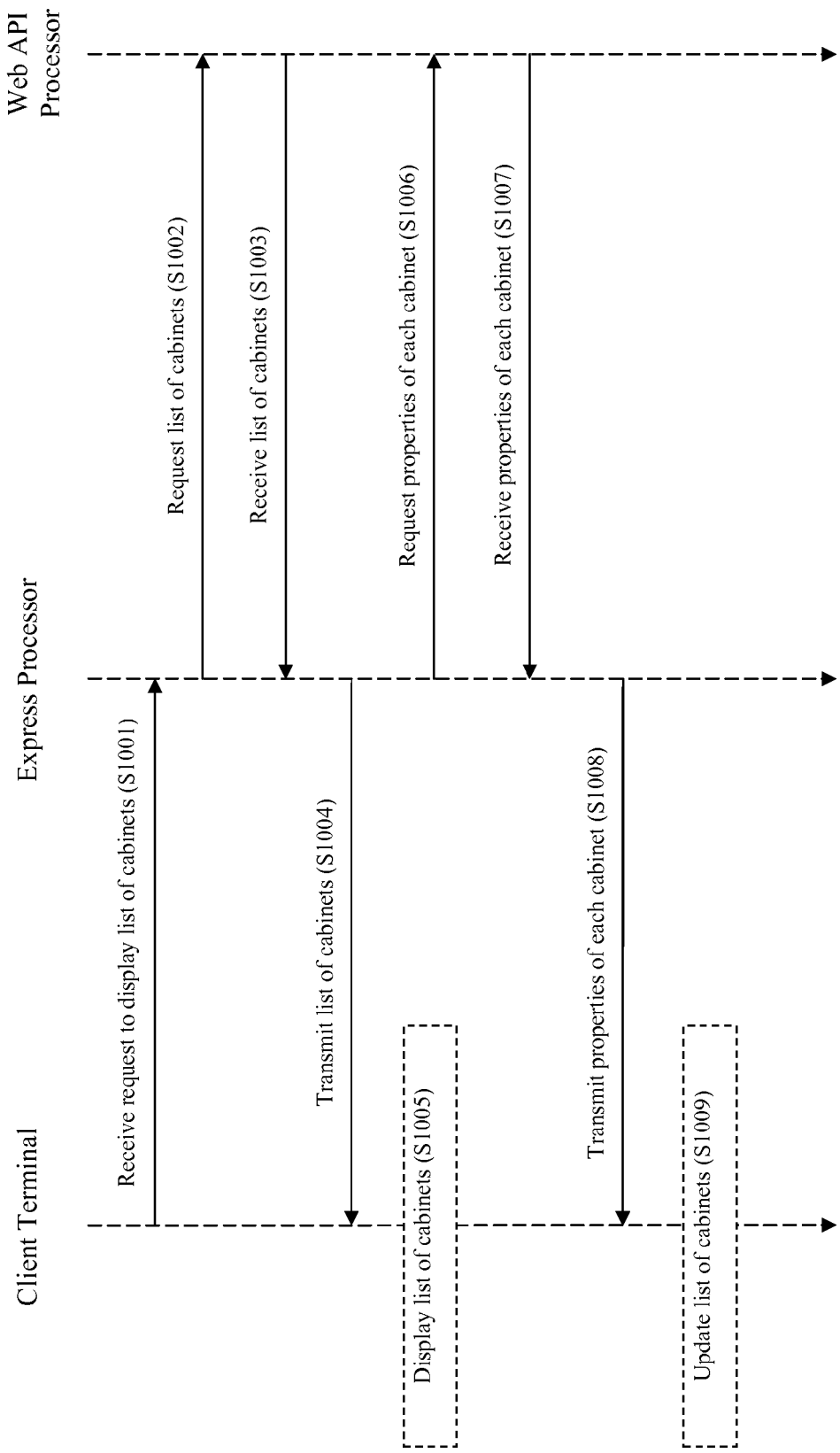
FIG. 10 shows a work flow of a method for displaying a cabinet list, according to an exemplary embodiment.

With reference to FIG. 10, a work flow of a method for displaying a cabinet list, according to an exemplary embodiment.

When the express processor receives from the client terminal a request to display a cabinet list (step S1001), the express processor requests a cabinet list from the web API processor (step S1002). The web API processor returns to the express processor a cabinet list (step S1003), and the express processor transmits the cabinet list to the client terminal (step S1004). The cabinet list is displayed to the user at the client terminal (step S1005). When the express processor requests the properties of each of the cabinets included in the cabinet list from the web API processor (step S1006), the web API processor returns to the express processor the properties of each of the cabinets included in the cabinet list (step S1007). The express processor then transmits the received properties to the client terminal (step S1008), and the client terminal updates the cabinet list based on the properties transmitted by the express processor (step S1009). For example, the properties of the cabinets may be displayed at the bottom of the cabinet list, as shown in FIG. 8G.

Figure 11:
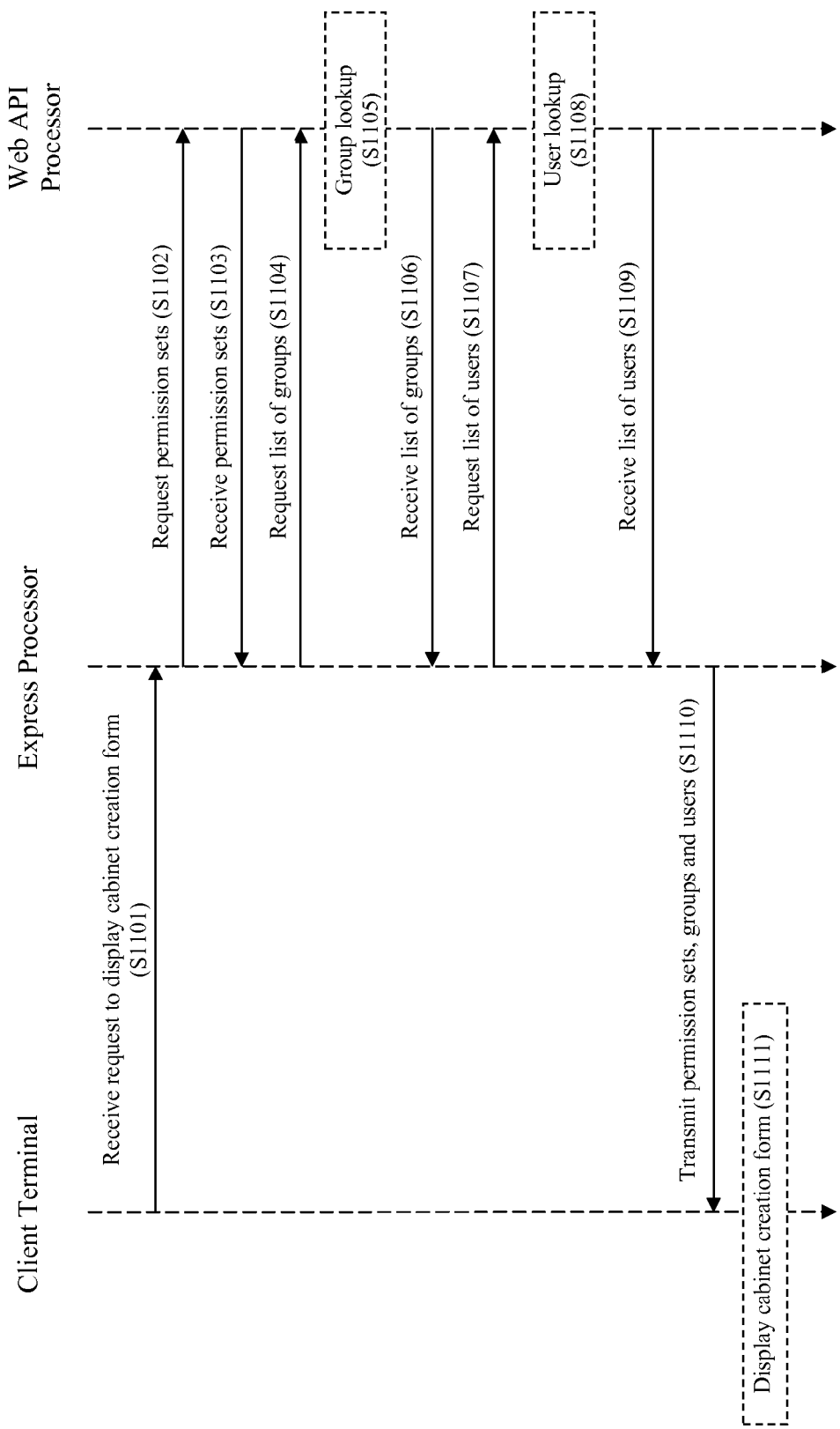
FIG. 11 shows a work flow of a method for displaying a cabinet creation form, according to an exemplary embodiment.

With reference to FIG. 11, a work flow of a method for displaying a cabinet creation form, according to an exemplary embodiment.

When the express processor receives from the client terminal a request to display a cabinet creation form (step S1101), the express processor requests permission sets from the web API processor (step S1102), which returns the requested permission sets back to the express processor (step S1103). In addition, the express processor requests the list of groups associated with the user account (step S1104). In response, the web API processor performs a group lookup (step S1105) and returns the list of groups associated with the user account to the express processor (step S1106). The express processor also requests the list of users associated with the user account (step S1107). In response, the web API processor performs a user lookup (step S1108) and returns the list of users associated with the user account to the express processor (step S1109). The express processor compiles a cabinet creation form (e.g. HTML) using the received permission sets, list of groups and list of users and transmits the cabinet creation form to the client terminal (Step S1110), and the cabinet creation form is displayed to the user at the client terminal (step S1111).

Figure 12:
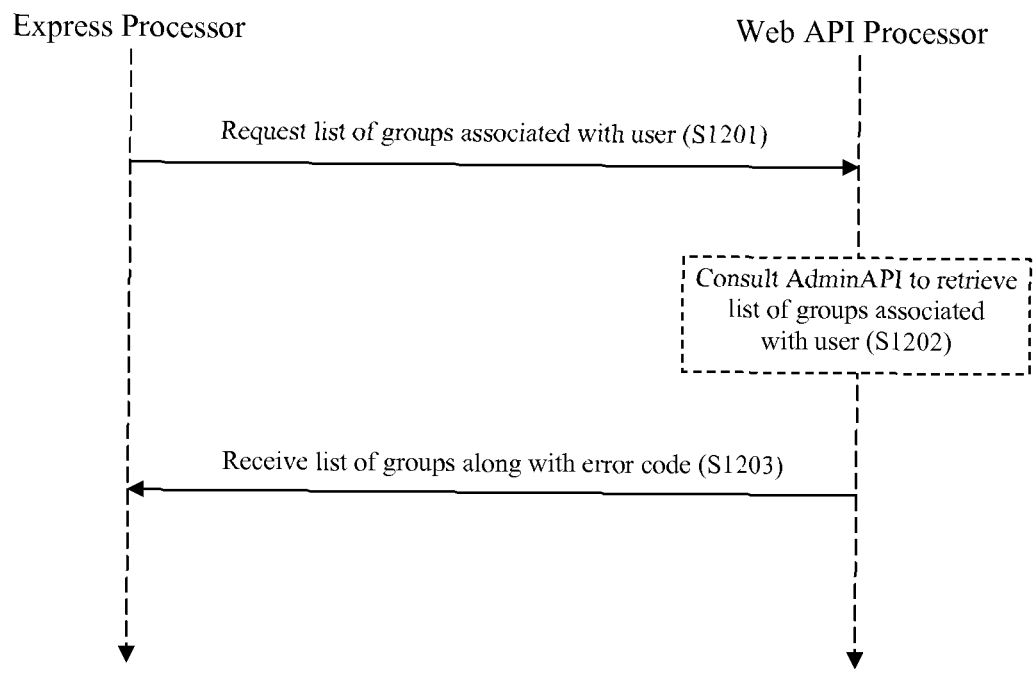
FIG. 12 shows a work flow of a method for performing a group lookup, according to an exemplary embodiment.

With reference to FIG. 12, a work flow of a method for performing a group lookup, according to an exemplary embodiment.

When the express processor requests (e.g. an HTTPS call) the list of groups associated with the user account from the web API processor (step S1201), the API processor consults the AdminAPI web services to retrieve the list of groups associated with the user account (step S1202). The retrieved list of groups is transmitted to the express processor along with an error code indicating whether the list of groups was successfully retrieved (step S1203).

Figure 13:
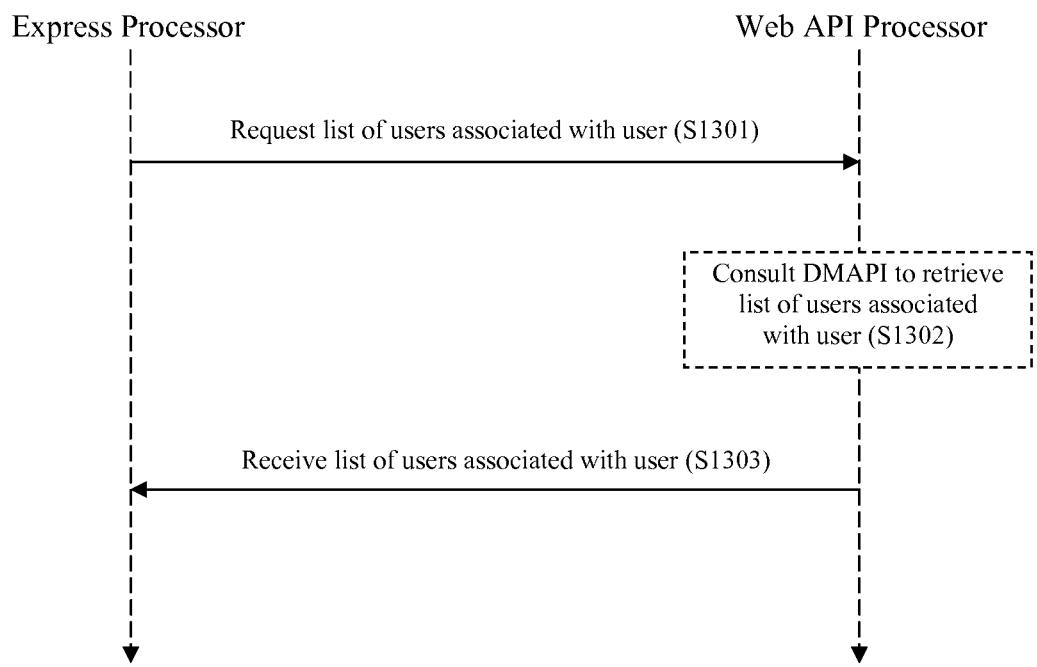
FIG. 13 shows a work flow of a method for performing a user lookup, according to an exemplary embodiment.

With reference to FIG. 13, a work flow of a method for performing a user lookup, according to an exemplary embodiment.

When the express processor requests (e.g. an HTTPS call) the list of users associated with the user account from the web API processor (step S1301), the API processor consults the DMAPI web services to retrieve the list of users associated with the user account (step S1302). The retrieved list of users is transmitted to the express processor along with an error code indicating whether the list of users was successfully retrieved (step S1303).

Figure 14:
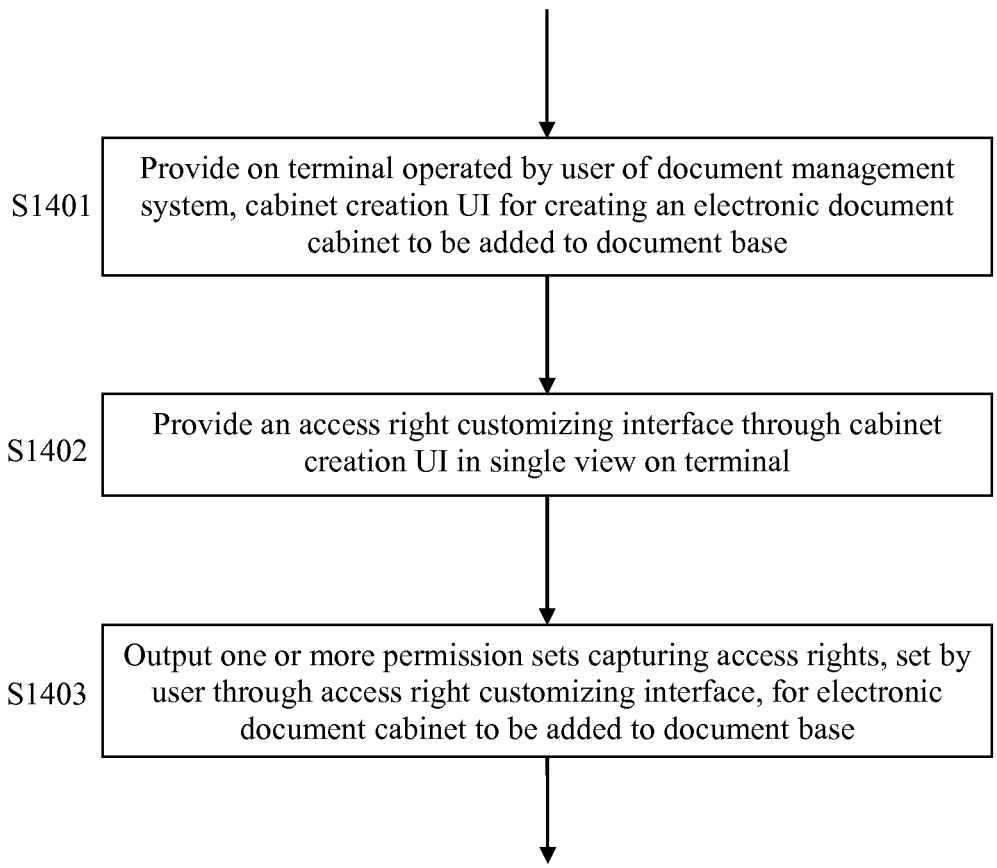
FIG. 14 shows a flow chart of a method performed by a document management application, according to an exemplary embodiment.

With reference to FIG. 14, a flow chart of a method performed by a document management application according to an exemplary embodiment is described.

Figure 15:
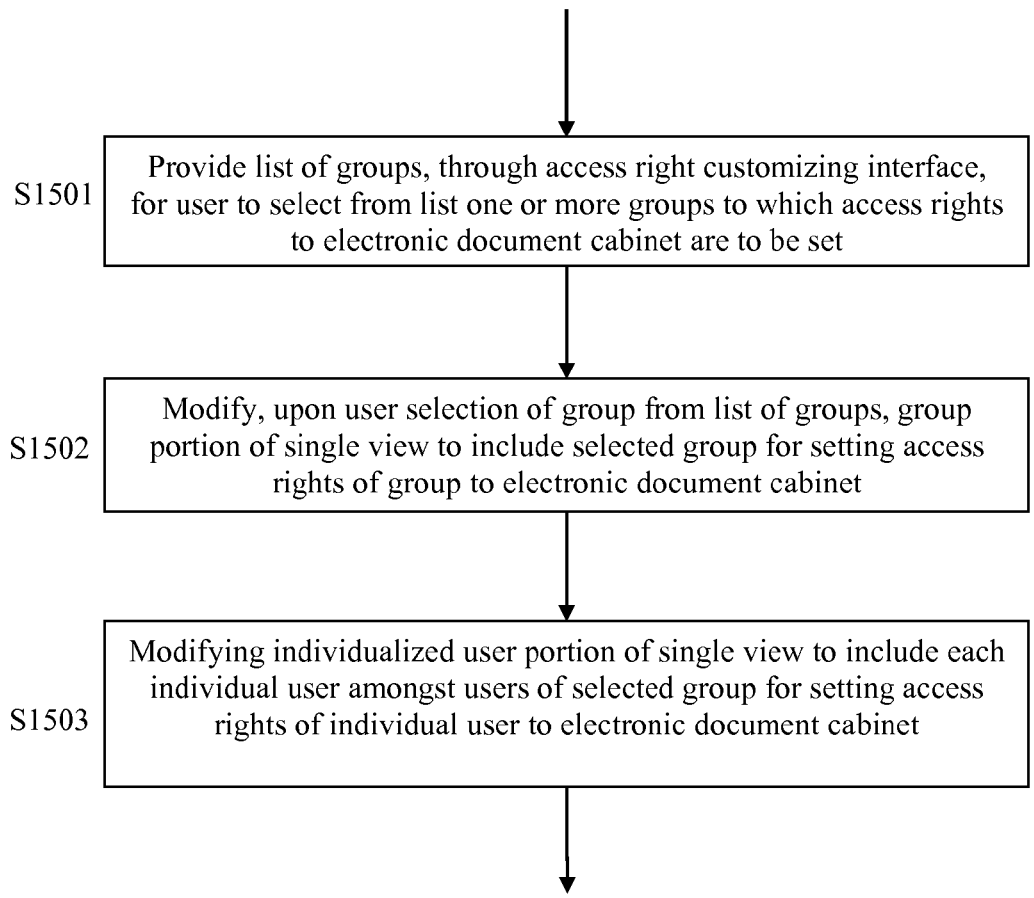
FIG. 15 shows a flow chart of a method performed by a document management application, according to an exemplary embodiment.

The document management application provides on a terminal operated by a user of a document management system, a cabinet creation UI for creating an electronic document cabinet to be added to a document base (step S1601). The document management application also provides an access right customizing interface through the cabinet creation UI in a single view, as shown at the bottom of the screen in the example of FIG. 8D) on the terminal (step S1602). When the user at the terminal has finished configuring the new cabinet to be created by completing the fields included in the cabinet creation UI, the document management application outputs the one or more permission sets capturing the access rights set by the user through the access right customizing interface, for the new electronic document cabinet to be added to the document base (e.g. maintained by the document management engine). With reference to FIG. 15, a flow chart of a method performed by a document management application according to an exemplary embodiment is described.

The document management application provides a list of groups, through the access right customizing interface, for the user to select from the list one or more groups to which access rights to the electronic document cabinet are to be set (step S1501). When the user has selected and specified access rights for a group, the document management application modifies the group portion of the single view to include the selected group for the purpose of setting access rights of the group to the electronic document cabinet (step S1502). In addition, when the user has selected and specified access rights for a user, the document management application modifies the individualized user portion of the single view to include the selected user for the purpose of setting access rights of the user to the electronic document cabinet (step S1503). Such user selection of specific groups and/or users is illustrated in the example of FIG. 8E.

Figure 16A:
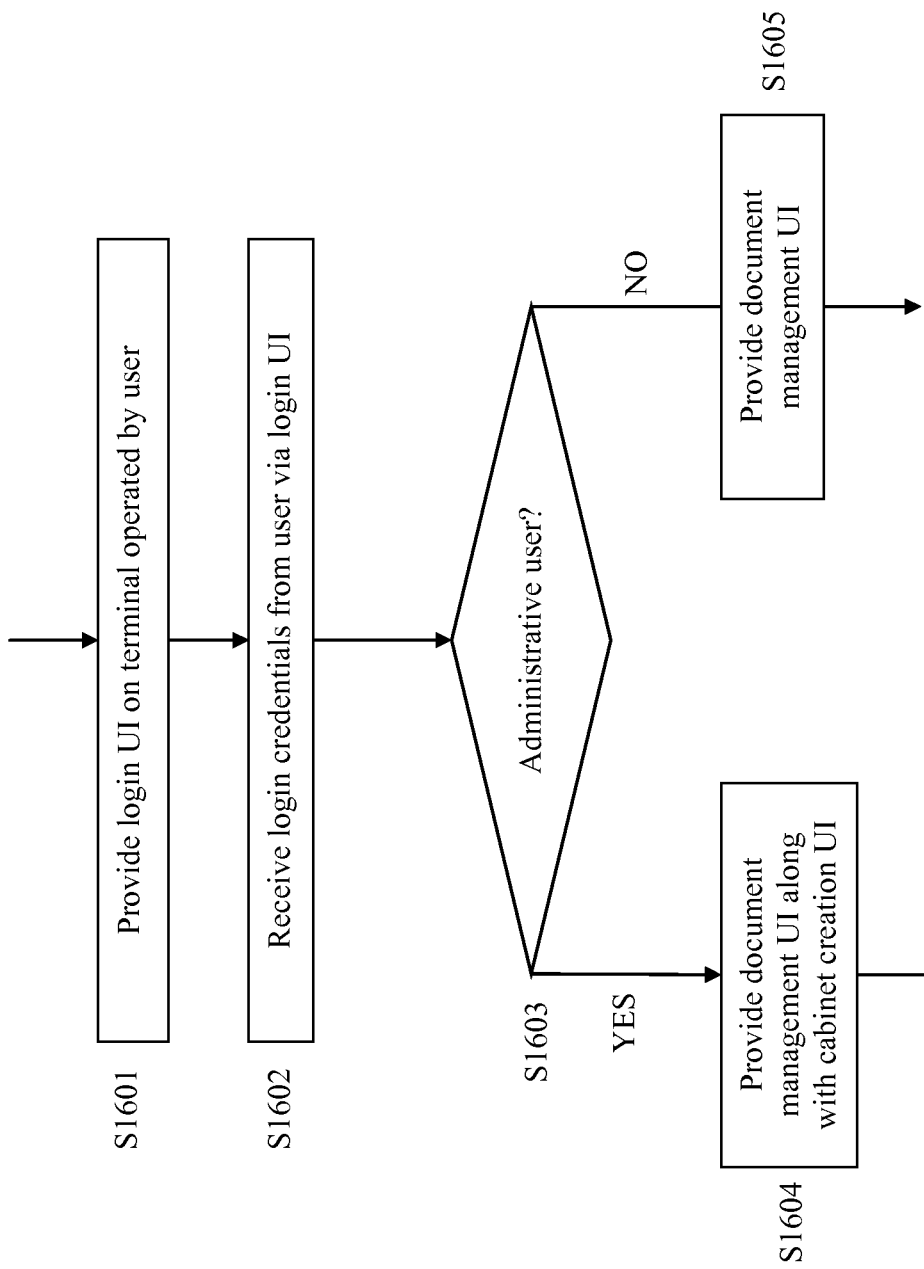
FIG. 16A shows a flow chart of a method for authenticating a user, according to an exemplary embodiment.

With reference to FIG. 16A, a flow chart of a method for authenticating a user according to an exemplary embodiment is described.

A login UI is displayed to the user at a client terminal (step S1601), and login credentials of the user is received via the login UI (step S1602). If it is determined based on the login credentials that the user is an administrative user (YES, 1603), a document management UI including cabinet management tools is displayed to the user at the client terminal (step S1604). On the other hand, if it is determined that the user is not an administrative user (e.g. a regular user) (NO, S1603), a document management UI which does not include cabinet management tools is displayed to the user at the terminal (step S1605).

Figure 16B:
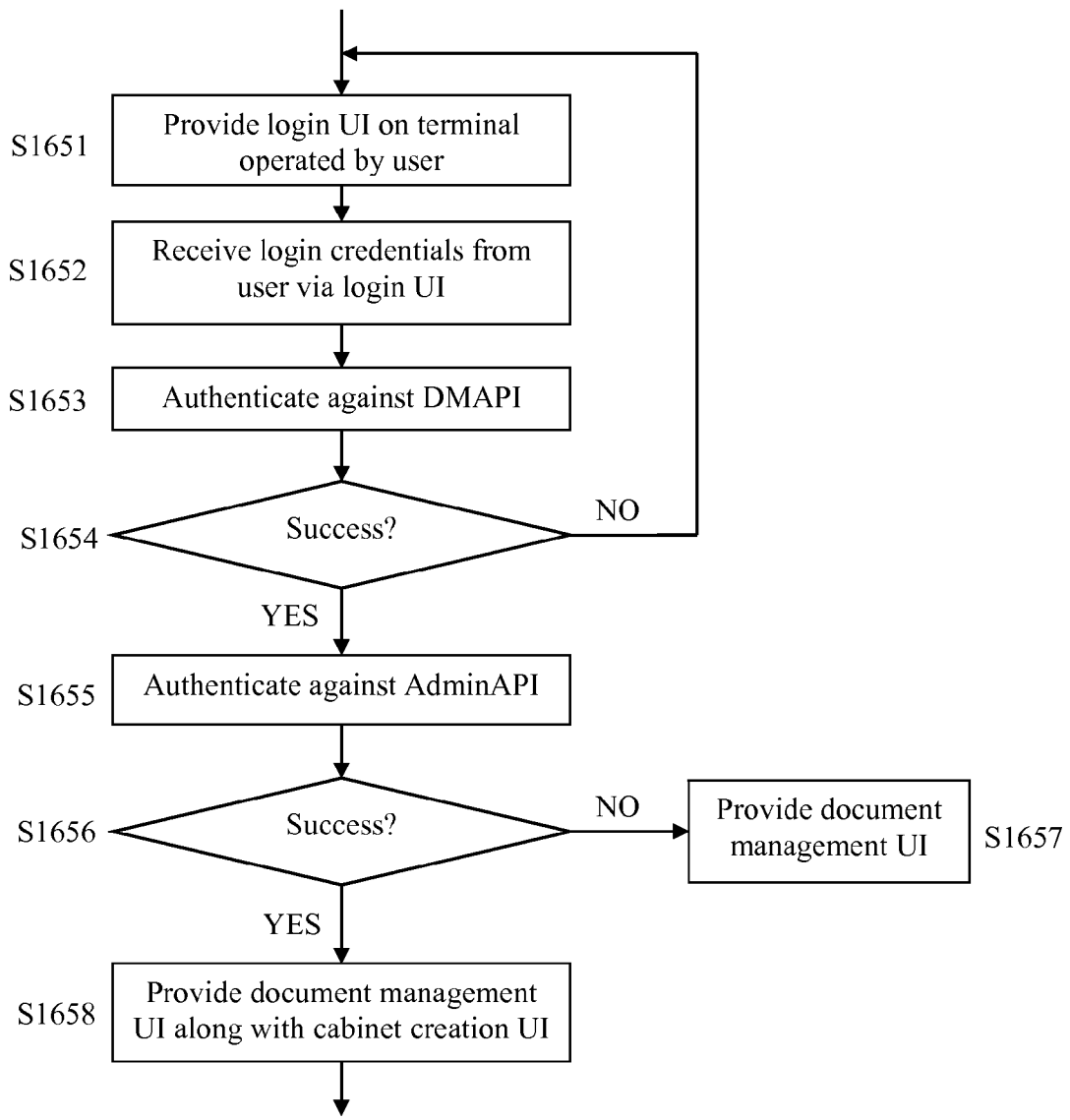
FIG. 16B shows a flow chart of a method for authenticating a user, according to another exemplary embodiment.

With reference to FIG. 16B, a flow chart of a method for authenticating a user according to another exemplary embodiment is described.

After a login UI is displayed to the user at the client terminal (step S1651) and login credentials of the user is received via the login UI (step S1652), the user is authenticated against the DMAPI web services, checking whether the user is a valid user of the document management system (step S1653). If the authentication of the user as a user of the document management system is unsuccessful (NO, step S1654), the user is taken back to the login UI. On the other hand, if authentication of the user as a user of the document management system is successful (YES, step S1654), the user is authenticated against the AdminAPI web services, checking whether the user is an administrative user of the document management system (step S1655). If the authentication of the user as an administrative user of the document management system is unsuccessful (NO, step S1656), a document management UI which does not include cabinet management tools is displayed to the user at the client terminal (step S1657). On the other hand, if authentication of the user as an administrative user of the document management system is successful (YES, step S1656), a document management UI including cabinet management tools is displayed to the user at the client terminal (step S1658).

Figure 17:
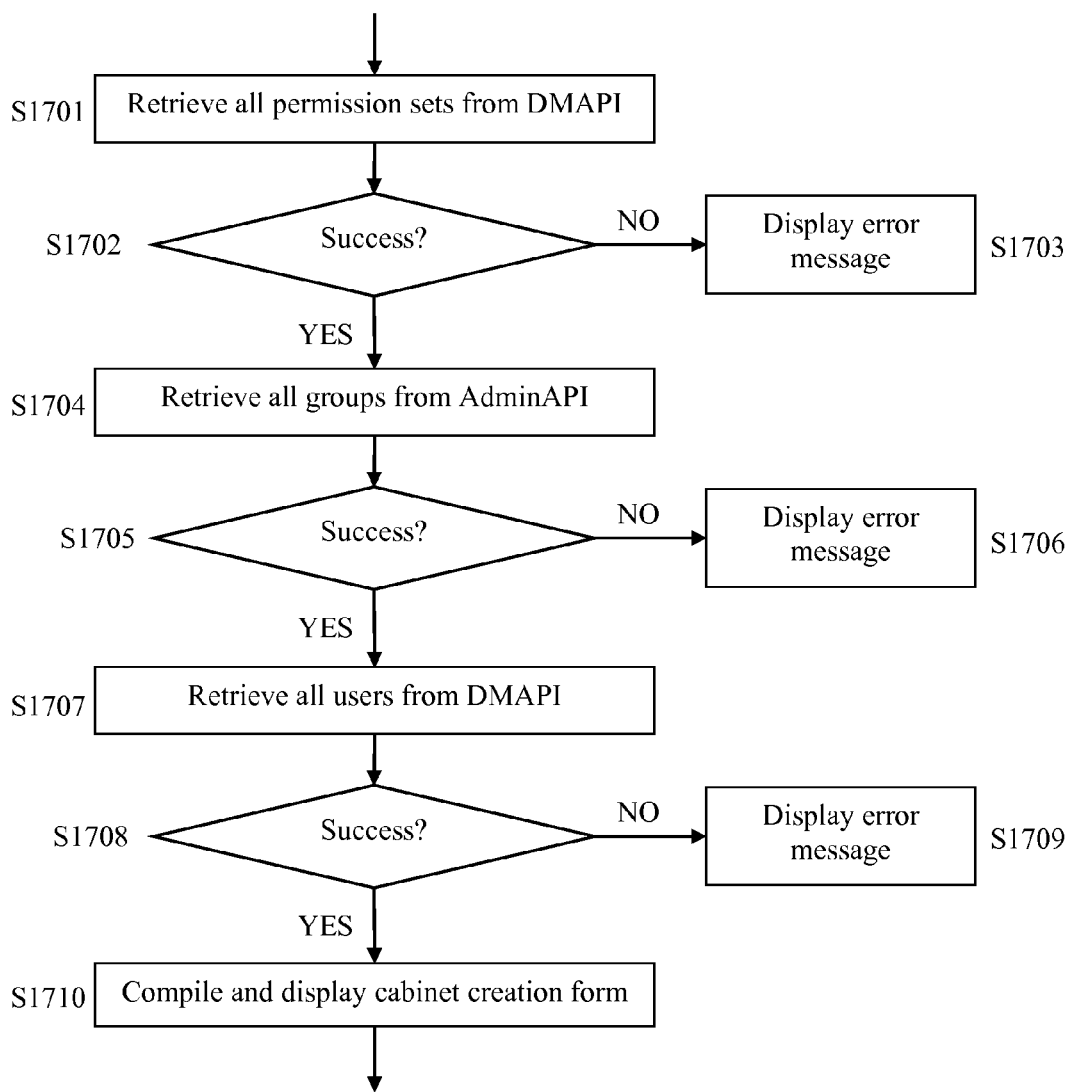
FIG. 17 shows a flow chart of a method for displaying a cabinet creation form, according to an exemplary embodiment.

With reference to FIG. 17, a flow chart of a method for displaying a cabinet creation form, according to an exemplary embodiment.

When a request to display a cabinet creation form is received, all permission sets are retrieved from the DMAPI web services (step S1701). If the retrieval of the permission sets is unsuccessful (NO, S1702), an error message is displayed (step S1703). If the retrieval of the permission sets is successful (YES, S1702), the list of groups associated with the user account (i.e. user account of the user currently logged in) is retrieved from the AdminAPI web services (step S1704). If the retrieval of the list of groups is unsuccessful (NO, S1705), an error message is displayed (step S1706). If the retrieval of the list of groups is successful (YES, S1705), the list of users associated with the user account is retrieved from the DMAPI web services (step S1707). If the retrieval of the list of users is unsuccessful (NO, S1708), an error message is displayed (step S1709). If the retrieval of the list of groups is successful (YES, S1708), the retrieved permission sets, list of groups and list of users are compiled into a cabinet creation form, and the compiled cabinet creation form is displayed to the user (step S1710).

Figure 18:
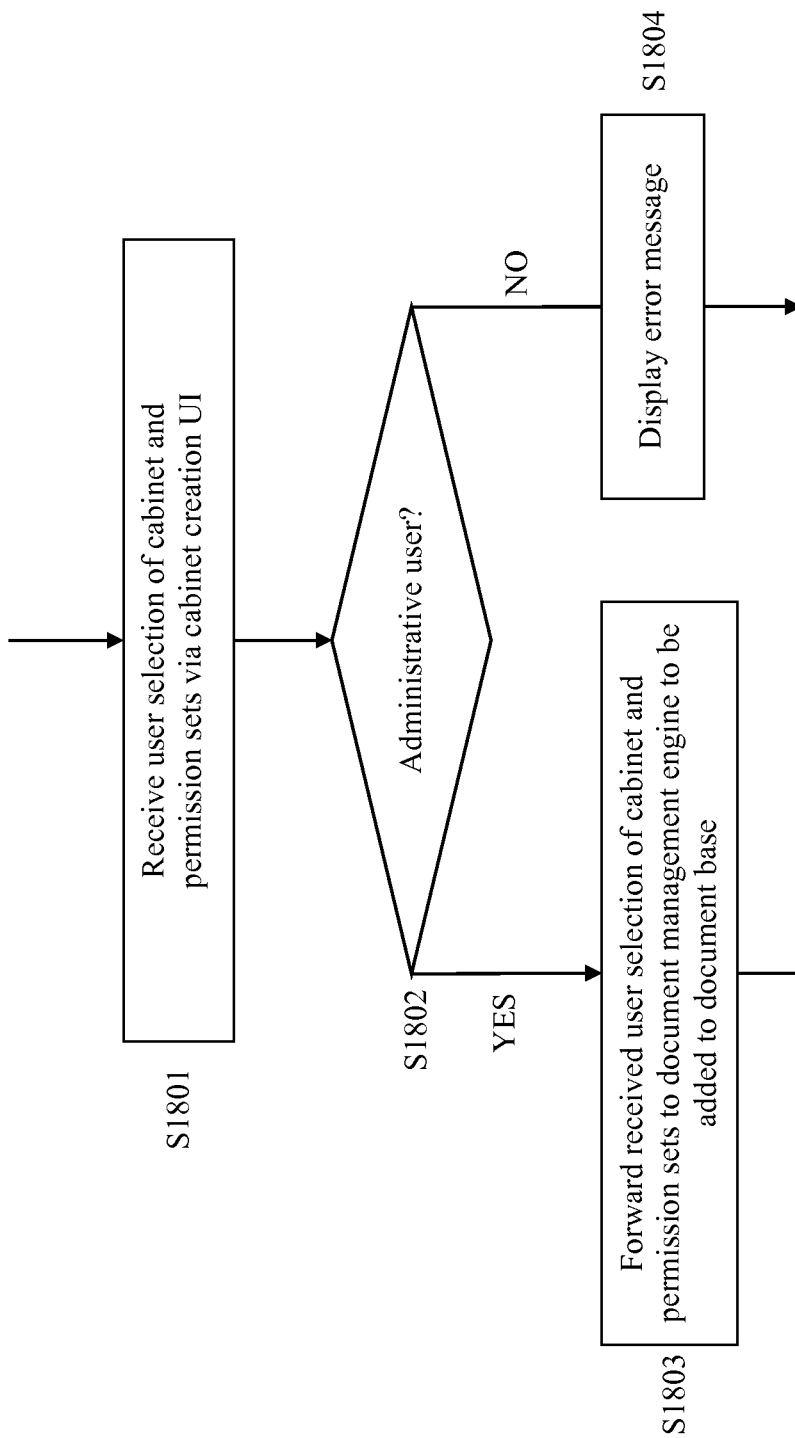
FIG. 18 shows a flow chart of a method for forwarding user-specified permission sets and a new cabinet to the document management engine, according to an exemplary embodiment.

With reference to FIG. 18, a flow chart of a method for forwarding user-specified permission sets and a new cabinet to the document management engine, according to an exemplary embodiment, is described.

When user selection of one or more permission sets and a new electronic document cabinet to be created is received via the cabinet creation UI (step S1801), it is checked whether the user is an administrative user (step S1802). If it is determined that the user is an administrative user (e.g. properly authenticated as an administrative user of the document management system) (YES, S1802), the received user selection of the one or more permission sets and the new cabinet is forwarded to the document management engine, to be added to the document base (step S1803). However, if it is determined that the user is not an administrative user (e.g. a regular user) (NO, S1802), an error message is displayed (step S1804), and the user selection received via the cabinet creation UI is not forward to the document management engine.

The orders in which the steps are performed in the aforementioned methods are not limited to those shown in the examples of FIGS. 9-18, and may be switched as long as similar results are achieved. Also, it should be noted that the methods illustrated in the examples of FIGS. 14-18 may be implemented using any of the systems described in connection with FIGS. 1-3.

In the aforementioned document management system, an administrative user can conveniently create a new cabinet (or folder) and configure the access rights of the new cabinet via a single user interface (i.e. single view, such as shown in FIG. 8D).

The aforementioned specific embodiments are illustrative, and many variations can be introduced on these embodiments without departing from the spirit of the disclosure or from the scope of the appended claims.

For example, elements and/or features of different examples and illustrative embodiments may be combined with each other and/or substituted for each other within the scope of this disclosure and appended claims.

What is claimed is:

1. A document management system including a non-transitory medium embodying one or more programs of instructions executable by one or more processing units in the document management system to configure the document management system to comprise:
    a document management engine that manages a document base including one or more electronic document cabinets containing documents; and
    a cabinet creation part that provides a cabinet creation user interface for creating an electronic document cabinet to be added to the document base, the cabinet creation user interface providing a first interface including (i) a cabinet name portion for naming the electronic document cabinet to be created and added to the document base, and (ii) a permission set portion for selecting one or more permission sets capturing the cabinet access rights, for the electronic document cabinet and contents therein, and upon user selection through the first interface, an access right customizing interface, in a single view and different from the first interface, for a user to customize cabinet access rights to said electronic document cabinet and contents therein,
    the single-view access right customizing interface which provides further option than the permission set portion through the first interface, including (a) the cabinet name portion, as provided in the first interface and is still available thorough the single-view access right customizing interface, and (b1) a group portion for adding and setting group access rights of a group of plural users, (b2) an individualized user portion for adding and setting individual access rights of each individual user amongst the plural users in the group, (c) a permission set portion for creating one or more permission sets capturing the cabinet access rights, for the electronic document cabinet and contents therein, and (d) a permission set name portion for specifying a name of a permission set capturing the cabinet access rights for the electronic document cabinet, wherein
    the cabinet creation part outputs the one or more permission sets capturing the cabinet access rights, set by the user through the first interface or through the access right customizing interface, for the electronic document cabinet to be added to the document base, and the document management engine registers in the document base, the electronic document cabinet and the one or more permission sets capturing the cabinet access rights and set through the first interface or through the single-view access right customizing interface, and
    wherein the cabinet creation part permits the user to create and name a new electronic document cabinet, configure the cabinet access rights, including the group access rights and the individual access rights, and create and name the one or more permission sets, for the electronic document cabinet and contents therein, via a single user interface view.

2. The system of claim 1, further comprising:
    a web service providing apparatus that provides the cabinet creation user interface through a network to a terminal operated by the user, and receives from the terminal the permission sets and the electronic document cabinet to be added, and forwards to the document management engine the permission sets and the electronic document cabinet to be added to the document base.

3. The system of claim 2, wherein the web service providing apparatus provides a login user interface through the network to the terminal operated by the user, and provides the cabinet creation user interface to the terminal operated by the user only after administrative login by the user is authenticated by the web service providing apparatus.

4. The system of claim 2, wherein the web service providing apparatus consults an application program interface, a group lookup interface and a users lookup interface to formulate the cabinet creation user interface including the access right customizing interface to be output to the terminal operated by the user.

5. The system of claim 1, further comprising:
    a document management application providing apparatus that communicates through a network with a document management application client on a terminal operated by the user, wherein the cabinet creation user interface is provided by the document management application client on the terminal operated by the user, and the document management application client on the terminal operated by the user communicates the permission sets and the electronic document cabinet to be added to the document management application providing apparatus, and the document management application providing apparatus forwards to the document management engine the permission sets and the electronic document cabinet to be added to the document base.

6. The system of claim 5, wherein the document management application client provides the cabinet creation user interface on the terminal operated by the user only after administrative login by the user and said administrative login is authenticated by the document management application providing apparatus.

7. The system of claim 5, wherein the document management application providing apparatus forwards to the document management engine the permission sets and the electronic document cabinet to be added to the document base, only after administrative login by the user through the document management application client is authenticated by the document management application providing apparatus.

8. The system of claim 1, wherein the cabinet creation part outputs the electronic document cabinet to be added and the permission sets capturing the access rights for the electronic document cabinet, as one object to be added to the document base.

9. The system of claim 1, wherein the access right customizing interface provides a list of groups, for the user to select from said list one or more groups to which access rights to the electronic document cabinet are to be set.

10. The system of claim 9, wherein upon user selection through the access right customizing interface of a group from the list of groups, the access right customizing interface modifies the group portion of the single view to include the selected group for setting access rights of the group to the electronic document cabinet, and modifies the individualized user portion of the single view to include each individual user amongst the users of the selected group for setting access rights of the individual user to the electronic document cabinet.

11. A document management application including one or more programs of computer-executable instructions embodied in a non-transitory computer-readable medium and executable by a processing unit of a terminal apparatus, to configure the terminal apparatus to include:

a cabinet creation part that provides a cabinet creation user interface for creating an electronic document cabinet to be added to the document base, the cabinet creation user interface providing a first interface including (i) a cabinet name portion for naming the electronic document cabinet to be created and added to the document base, and (ii) a permission set portion for one or more permission sets capturing the cabinet access rights, for the electronic document cabinet and contents therein, and upon user selection through the first interface, an access right customizing interface, in a single view and different from the first interface, for a user to customize cabinet access rights to said electronic document cabinet and contents therein, the single-view access right customizing interface which provides further option than the permission set portion through the first interface, including (a) the cabinet name portion, as provided in the first interface and is still available thorough the single-view access right customizing interface, and (b1) a group portion for adding and setting group access rights of a group of plural users, (b2) an individualized user portion for adding and setting individual access rights of each individual user amongst the plural users in the group, (c) a permission set portion for creating one or more permission sets capturing the cabinet access rights, for the electronic document cabinet and contents therein, and (d) a permission set name portion for specifying a name of a permission set capturing the cabinet access rights for the electronic document cabinet, wherein the cabinet creation part outputs the one or more permission sets capturing the access rights, set through the first interface or through the access right customizing interface, for the electronic document cabinet to be added to the document base, and the electronic document cabinet and the one or more permission sets capturing the cabinet access rights and set through the first interface or through the single-view access right customizing interface are registered in the document base, and wherein the cabinet creation part permits the user to create and name a new electronic document cabinet, configure the cabinet access rights, including the group access rights and the individual access rights, and create and name the one or more permission sets, for the electronic document cabinet and contents therein, via a single user interface view.

12. The document management application of claim 11, wherein the cabinet creation part outputs the electronic document cabinet to be added and the permission sets capturing the access rights for the electronic document cabinet, as one object to be added to the document base.

13. The document management application of claim 11, wherein the access right customizing interface provides a list of groups, for the user to select from said list one or more groups to which access rights to the electronic document cabinet are to be set.

14. The document management application of claim 11, wherein upon user selection through the access right customizing interface of a group from the list of groups, the access right customizing interface modifies the group portion of the single view to include the selected group for setting access rights of the group to the electronic document cabinet, and modifies the individualized user portion of the single view to include each individual user amongst the users of the selected group for setting access rights of the individual user to the electronic document cabinet.

15. The document management application of claim 11, further comprising:

a login user interface through which the user provides login information to the document management application, wherein the document management application provides the cabinet creation user interface on the terminal to the user only after administrative login by the user is authenticated by the document management application.

16. A method performed by a document management application executing in a document management system including one or more processing units, said method comprising:

providing on a terminal operated by a user of the document management system, a cabinet creation user interface for creating an electronic document cabinet to be added to a document base;

providing through the cabinet creation user interface, on the terminal, a first interface including (i) a cabinet name portion for naming the electronic document cabinet to be created and added to the document base, and (ii) a permission set portion for selecting one or more permission sets capturing the cabinet access rights, for the electronic document cabinet and contents therein, and upon user selection through the first interface, an access right customizing interface, in a single view and different from the first interface, for a user to customize cabinet access rights to said electronic document cabinet and contents therein, the single-view access right customizing interface which provides further option than the permission set portion through the first interface, including (a) the cabinet name portion, as provided in the first interface and is still available thorough the single-view access right customizing interface, and (b1) a group portion for adding and setting group access rights of a group of plural users, (b2) an individualized user portion for adding and setting individual access rights of each individual user amongst the plural users in the group, (c) a permission set portion for creating one or more permission sets capturing the cabinet access rights, for the electronic document cabinet and contents therein, and (d) a permission set name portion for specifying a name of a permission set capturing the cabinet access rights for the electronic document cabinet, wherein outputting the one or more permission sets capturing the access rights, set by the user through the first interface or through the access right customizing interface, for the electronic document cabinet to be added to the document, wherein the electronic document cabinet and the one or more permission sets capturing the cabinet access rights and set through the first interface or through the single-view access right customizing interface are registered in the document base, and wherein the cabinet creation part permits the user to create and name a new electronic document cabinet, configure the cabinet access rights, including the group access rights and the individual access rights, and create and name the one or more permission sets, for the electronic document cabinet and contents therein, via a single user interface view.

17. The method of claim 16, further comprising:

providing a list of groups, through the access right customizing interface, for the user to select from said list one or more groups to which access rights to the electronic document cabinet are to be set; and modifying, upon user selection through the access right customizing interface of a group from the list of groups, the group portion of the single view to include the selected group for setting access rights of the group to the electronic document cabinet, and modifying the individualized user portion of the single view to include each individual user amongst the users of the selected group for setting access rights of the individual user to the electronic document cabinet.

18. The method of claim 16 further comprising consulting, by the document management application, an application program interface, a group lookup interface and a users lookup interface to formulate the cabinet creation user interface including the access right customizing interface to be output to the user.

19. The method of claim 16, further comprising:

providing a login user interface on the terminal operated by the user, wherein the cabinet creation user interface is provided on the terminal to the user only after administrative login by the user is authenticated by the document management application.

* * * * *